(12) United States Patent
Manoharan et al.

(10) Patent No.: US 6,952,395 B1
(45) Date of Patent: Oct. 4, 2005

(54) OPTICAL NETWORK RESTORATION

(75) Inventors: Madan Manoharan, Petaluma, CA (US); Aravind Gopalan, Santa Rosa, CA (US); Srikanth R. Vadi, Rohnert Park, CA (US)

(73) Assignee: Calix Networks, Inc., Petaluma, CA (US)

( * ) Notice: Subject to any disclaimer, the term of this patent is extended or adjusted under 35 U.S.C. 154(b) by 812 days.

(21) Appl. No.: 09/872,851

(22) Filed: Jun. 1, 2001

(51) Int. Cl.$^7$ ............................................. H04L 12/26
(52) U.S. Cl. ........................... 370/219; 370/223; 398/4
(58) Field of Search ........................ 370/216, 217–223, 370/229, 232, 236; 398/1–8

(56) References Cited

U.S. PATENT DOCUMENTS

| | | | |
|---|---|---|---|
| 3,652,798 A | 3/1972 | McNeilly et al. | 179/15 AL |
| 4,835,763 A | 5/1989 | Lau | 370/16 |
| 5,003,531 A | 3/1991 | Farinholt et al. | 370/16.1 |
| 5,150,356 A | 9/1992 | Tsutsui | 370/16.1 |
| 5,307,353 A | 4/1994 | Yamashita et al. | 371/11.2 |
| 5,572,513 A | 11/1996 | Yamamoto et al. | 370/16 |
| 5,751,696 A | 5/1998 | Bechtel et al. | 370/223 |
| 5,757,774 A | 5/1998 | Oka | 370/242 |
| 5,832,197 A | 11/1998 | Houji | 395/182.02 |
| 5,838,924 A * | 11/1998 | Anderson et al. | 709/239 |
| 5,923,449 A | 7/1999 | Doerr et al. | 359/125 |
| 6,643,254 B1 * | 11/2003 | Kajitani et al. | 370/217 |
| 6,657,952 B1 * | 12/2003 | Shiragaki et al. | 370/223 |
| 6,665,263 B1 * | 12/2003 | Kawabata et al. | 370/219 |
| 6,721,502 B1 * | 4/2004 | Al-Salameh et al. | 398/3 |
| 6,731,832 B2 * | 5/2004 | Alvarez et al. | 385/16 |
| 6,775,229 B1 * | 8/2004 | Mo et al. | 370/220 |

OTHER PUBLICATIONS

Meijen et al., "Multi-Layer Survivability," Lucent Technologies, White Paper, Optical Networking Group, pp. 1-19.
Internet Engineering Task Force ("IETF") Request for Comments ("RFC") No. 3031—Multiprotocol Label Switching Architecture.

* cited by examiner

*Primary Examiner*—Wellington Chin
*Assistant Examiner*—John Shew
(74) *Attorney, Agent, or Firm*—Silicon Valley Patent Group LLP

(57) ABSTRACT

A method for protecting the flows of traffic against, and for restoring them from, a failure in a multifunctional, hybrid broadband access-and-transport network system includes the provisioning of at least two Virtual Flows ("VFs") of traffic between each pair of ingress and egress ("I/E") nodes in the system. The at least two VFs are provisioned such that each takes a different physical path from the other. The VFs taking the same physical path are then respectively grouped into two "Path Protection Groups" ("PPGs"). Each of the PPGs has a dedicated "Management Control Flow" ("MCF") provisioned within it that is carried in the at least one VF contained therein. The detection of a fault in the traffic in an "active" PPG results in the generation of a protection switching signal ("PSS") being generated and sent by the nodes detecting the fault along the MCF of the affected PPG to the relevant "protection switching entities" ("PSEs"), i.e., the affected I/E nodes, which responsively effect a protection switch of either the reception, or both the transmission and the reception, of the affected traffic from the affected "active" PPG to the associated "protect" PPG to thereby restore path and traffic continuity within the system. The method is independent of the transport layer and can thus be used to protect traffic in networks having transport systems other than SONET.

13 Claims, 10 Drawing Sheets

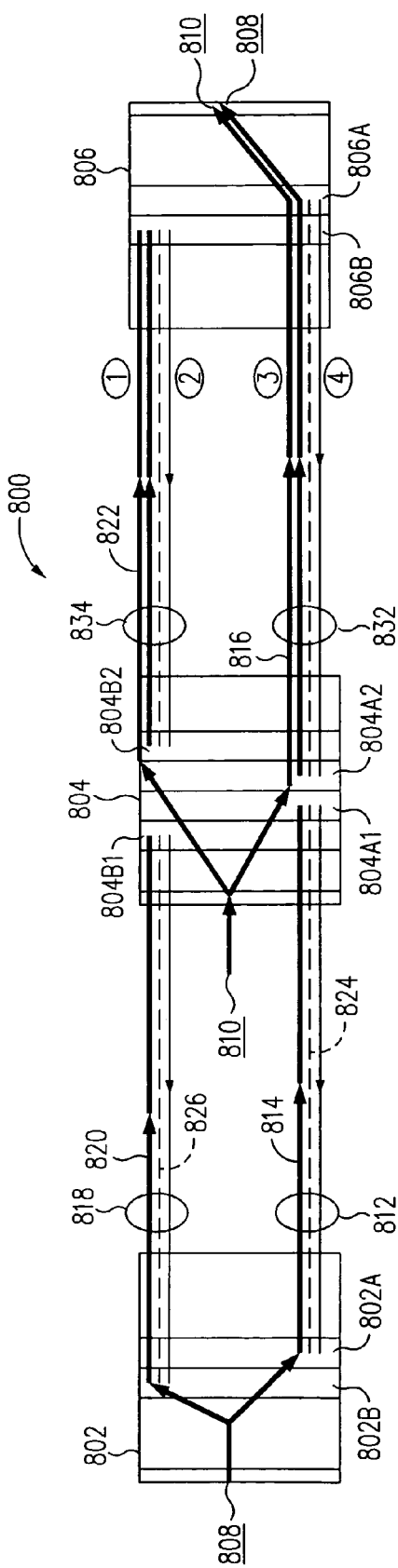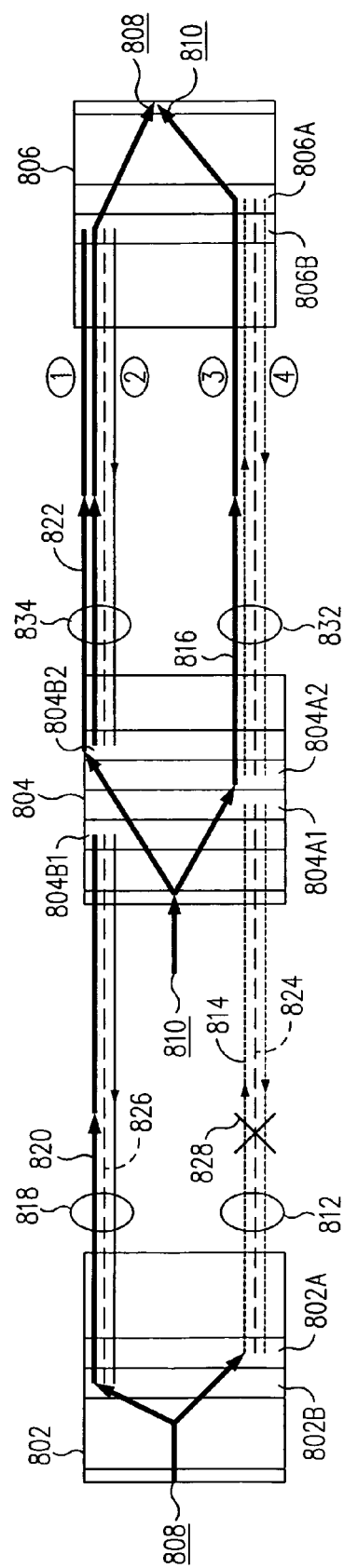
FIG. 8A
FIG. 8B

OPTICAL NETWORK RESTORATION

RELATED APPLICATIONS

This application is related to U.S. application Ser. No. 09/793,071, filed Feb. 26, 2001.

BACKGROUND

1. Technical Field

This invention relates generally to telecommunications, and more particularly, to a method for restoring internal path and equipment failures in a hybrid broadband access-and-transport network system.

2. Related Art

Two closely interrelated segments of multi-service networking are "access" and "transport." "Access" refers to the technology by which users connect to a wide area network ("WAN"), and through it, to service providers or other users connected to the WAN at locations remote from the user. "Transport" refers to the technologies that make up the fabric of the WAN itself, including those relating to the transmission of the users' information across the WAN.

One model of a high-speed access-and-transport network system for which detailed standards have been developed by the International Telecommunication Union ("ITU") is the "Broadband Integrated Services Digital Network" ("BISDN") "umbrella" model, which, in one widely regarded embodiment, can be characterized as Asynchronous Transport Mode ("ATM") over a Synchronous Optical Network ("SONET") transmission system ("ATM/SONET").

Thus, one conventional paradigm of a BISDN access-and-transport system contemplates, 1) the "gathering" of lower-level voice, video, and data signals in a variety of formats from a large number of individual users at a "user network interface" ("UNI") located at the edge of a WAN, 2) the "grooming" of those signals, first by "ATM-izing," or "cellification" of the signals, if necessary, into fixed-length ATM cells, then by packaging, or "mapping," the ATM cells into SONET synchronous payload envelope ("SPE") structures, or "Synchronous Transport Stream" ("STS") frames, of incremental capacities using high-speed switching techniques and an addressing system of "pointers" and transport and path overhead ("TOH" and "POH"), and 3) the "scattering" of the signals out over the WAN to their intended destinations.

However, some concerns exist regarding the "ATM/SONET" paradigm as it pertains to certain types of traffic, viz., voice and video signals, which are inherently isochronous or plesiochronous (i.e., time-division-multiplexed ("TDM") traffic), as well as Internet Protocol ("IP") traffic, which, unlike both ATM and TDM traffic, is by nature "connectionless." While it is possible to ATM-ize both types of traffic, the resultant loss of bandwidth can greatly offset the increase in effective bandwidth afforded by the "statistical multiplexing" capabilities of ATM.

In light of the foregoing concerns, the assignee hereof has developed a novel, multi-functional, "hybrid" access-and-transport system, called the "C7" system, that is capable of supporting a wide variety of user interfaces, in terms of bandwidth, density, interface and application. It is a "hybrid" system, in that it is capable of efficiently gathering, grooming, and transporting both classical time division multiplexed ("TDM") and packet-switched (i.e., ATM, Multiprotocol Label Switching ("MPLS"), IP, Packet Over SONET ("POS"), and Frame Relay) types of traffic streams in their respective formats and protocols, thereby maximizing available bandwidth through the use of statistical multiplexing, while preserving or even improving the QoS level achievable in such a disparate traffic mix. The C7 system can be deployed in any of several different topologies, including linear point-to-point, ring, star, mesh or any combination of the foregoing.

As those of skill in the art will appreciate, it is necessary for economic reasons to provide "end-to-end" protection for the traffic carried within any broadband access and transport system, i.e., some method for quickly "healing," or restoring, the flow of traffic in the system in the event of an equipment failure or other problem in the transport media, such as a break in a fiber.

In the C7 system, a "concatenated" form of end-to-end traffic protection is provided that comprises two parts: 1) An "external" form of "equipment protection" applied between the users and the access "nodes" at the edge of the system, which is described in the above-referenced patent application Ser. No. 09/793,071, filed Feb. 26, 2001, and 2) an "internal" form of traffic protection described herein as an "Optical Mesh Restoration Protocol" ("OMRP"), that is applied to the internal core of the network.

Conventional "pure TDM" network equipments can implement either a line protection method, or a Virtual Tributary/STS ("VT/STS") path protection method. Examples of such methods and equipments may be found in, e.g. U.S. Pat. No. 5,757,774 to Oka; U.S. Pat. No. 5,572,513 to Yamamoto et al.; U.S. Pat. No. 5,307,353 to Yamashita et al.; and U.S. Pat. No. 5,003,531 to Farinholt et al. However, "pure packet" (e.g. ATM, MPLS, or IP) based equipments implementing such a VT/STS path protection method cannot take advantage of the statistical multiplexing ability afforded by packet technology without the use of some form of external grooming equipment, e.g., ATM switches, IP routers, IP switches, and MPLS switches.

Conventional "pure ATM" equipments can implement either line protection or Virtual Path ("VP") protection methods, but not both. A pure ATM system implementing path switching may be found in U.S. Pat. No. 5,150,356 to Tsutsui. However, existing VP path protection standards do not support so-called "self-healing" rings, nor do they support TDM traffic unless it is first ATM-ized, with the resultant significant loss in bandwidth problem described above.

Conventional ATM-over-SONET equipments can implement either VP path switching, at the path layer, or VT/STS line or path switching, at the transport layer, or both, in a complex, "multi-layered" approach. In such systems, it is necessary to apply some technique, such as a time delay mechanism, to one of the protection methods, typically the slower of the two, to prevent one method from interfering with the other. An example of such a multi-layered approach with a time delay mechanism in an ATM/SONET network can be found in U.S. Pat. No. 5,838,924 to Anderson et. al.

There are currently no standard IP traffic protection methods, other than the conventional IP packet "rerouting" algorithms, e.g. the "Open Shortest Path First" ("OSPF") protocol.

A hybrid system, i.e., one that can support TDM, ATM and MPLS packets, e.g., MPLS IP packets, such as the C7 system, can implement either a line switching or a path switching protection method. However, while a line protection method is easier to implement in a hybrid system, a path protection method provides more overall protection coverage, and hence, is preferable to the former.

One possible path protection method for hybrid equipment is the conventional STS/VT path protection method. However, this method does not permit a hybrid equipment to take full advantage of the statistical multiplexing capabilities provided by packet technologies. A need therefore exists for a new path protection and restoration method for a hybrid equipment that takes full advantage of both the statistical multiplexing capability provided by packet (i.e., ATM, MPLS, IP) switching technology, as well as the "self-healing" properties of a ring topology, and yet one which can also support conventional TDM without requiring the TDM traffic to be packetized.

SUMMARY

This invention provides an "Optical Mesh Restoration Protocol" ("OMRP"), or method, for network path protection and restoration in a hybrid broadband access and transport system that is capable of supporting a full spectrum of traffic types, including TDM, ATM, MPLS, and IP traffic. The OMRP takes full advantage of statistical multiplexing without the necessity of packetizing the TDM traffic, and without the complexity of supporting two different path protection schemes at the same time. The OMRP is designed to implement self-healing rings, and of particular importance, is independent of the transport layer, so that it can be used for traffic over other and different transport layers, including direct Wavelength Division Multiplexing ("WDM," or "λ").

The novel OMRP method includes the provisioning of at least two (and for full duplex operation, four) Virtual Flows ("VFs") of hybrid traffic between each pair of traffic "ingress" and "egress" ("I/E") nodes in the system. The at least two VFs are provisioned such that each VF takes a different physical path, i.e., a different wire or fiber, from that taken by the other VF between the two I/E nodes. The VFs that take the same physical path, or fiber, between the two I/E nodes are then grouped into a respective one of two "Path Protection Groups" ("PPGs"), each of which therefore also takes a different physical path from the other PPG between the I/E nodes. Each of the two PPGs has a dedicated "Management Control Flow" ("MCF") provisioned within it that is carried in the at least one VF contained therein.

The VFs are analogous to TDM VTs and ATM VPs, and the MCF is analogous to the "Operations, Administration, and Maintenance" ("OAM") channels in pure STS/VT systems, and the OAM "flows" ("F1–F5") in pure ATM systems.

In one embodiment, called "hop-by-hop" provisioning, the VFs in the respective PPGs are manually provisioned by the system operator in each of the nodes disposed along the explicit paths that the traffic between the two I/E nodes is required to take. In another possible embodiment, called an "A–Z" method, the system operator provides the traffic parameters required between specific I/E node pairs, and the system itself automatically provisions the VFs between the two nodes. In either embodiment, the values for a PPG's MCF are dynamically assigned by a connection control subsystem in the Ingress node that processes a provisioning request.

The method further involves the detection of any interruption in the traffic transported in an "active," or "working," PPG, which is effected by the nodes immediately "upstream" and "downstream," respectively, of the interruption. These "failure detecting nodes" may include one, the other, both, or neither, of the two I/E nodes in the affected I/E node pair, depending on the location of the fault and the presence of intervening nodes through which the affected active PPG is routed.

When a fault in the traffic in an active PPG is detected, e.g., a cut in the fiber on which the PPG is carried, the method includes the generation of a protection switching signal ("PSS") by the nodes detecting the fault, and the transmission of that signal in the respective MCFs of each PPG affected by the fault, i.e., each PPG carried on the cut fiber, to the relevant "protection switching entities" ("PSEs"), viz., one or both of the I/E nodes themselves, which then responsively switch either the receipt of the affected traffic, in a system operating in "bridged" mode, or both the transmission and the receipt of the affected traffic, in a system operating in an "un-bridged" mode, from the affected "active" PPG to the associated "protect" PPG to thereby restore path and signal continuity within the system.

A better understanding of the above and many other features and advantages of the present invention may be obtained from a consideration of the detailed description below of certain exemplary embodiments thereof, particularly if such consideration is made in conjunction with the figures of the appended drawings.

DESCRIPTION OF THE DRAWINGS

FIG. 8A is a schematic representation of a hybrid system deployed in a bridged, point-to-point configuration having an intermediate node during normal operation;

FIG. 8B is a schematic representation of the bridged, point-to-point hybrid system with intermediate node shown in FIG. 8A after a traffic flow failure and restoration thereof in accordance with the OMRP method;

DETAILED DESCRIPTION

Figure 1:
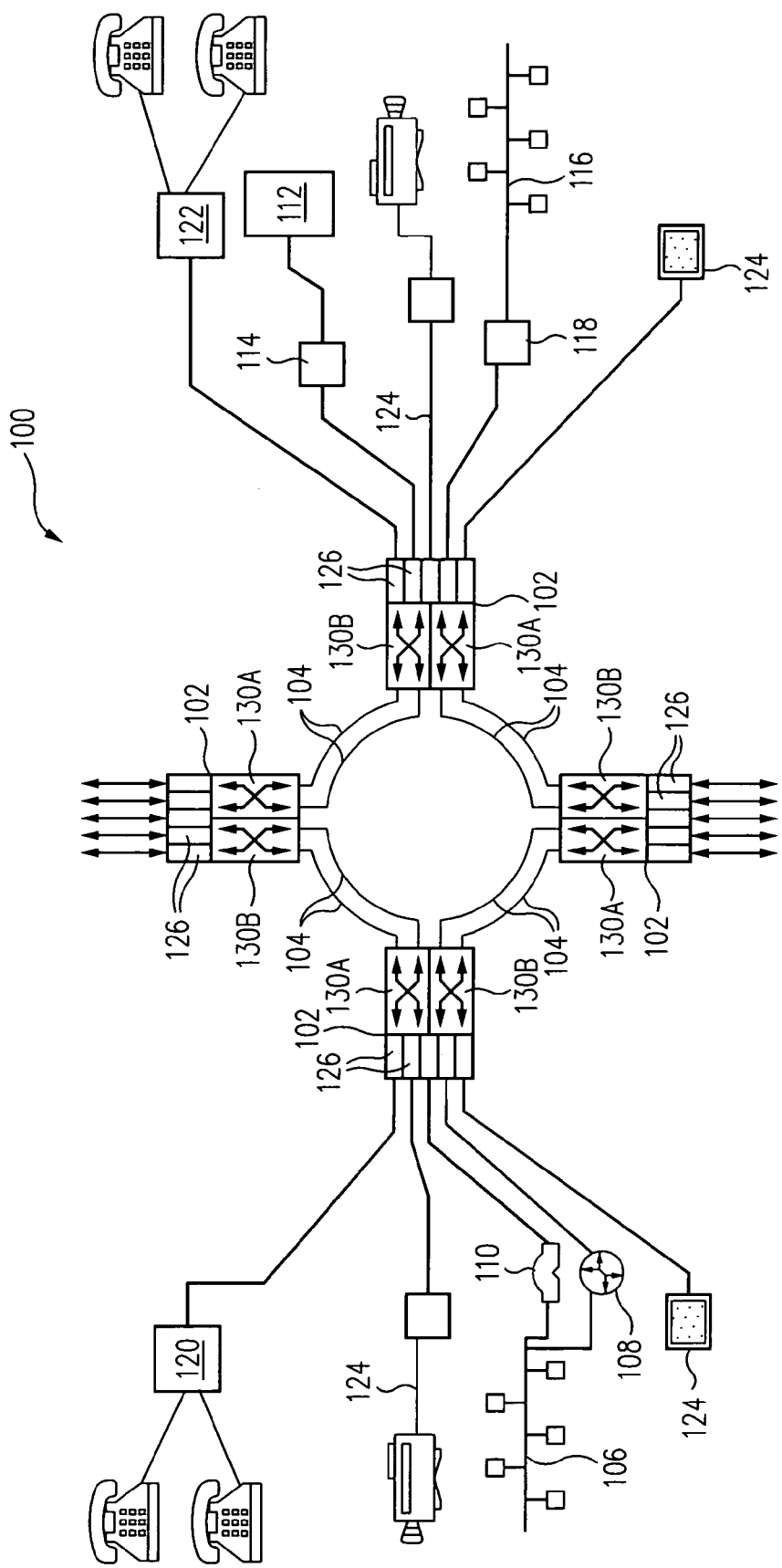
FIG. 1 is a schematic representation of a hybrid access-and-transport system deployed in a "ring" topology, interconnecting users and service providers in a wide area network ("WAN"), and incorporating the optical mesh restoration protocol ("OMRP") method of the present invention.

ATM was chosen by the ITU as the BISDN "universal" network and transport protocol for a broad range of user information, including voice, data, and video, over a user-to-network interface ("UNI"). ATM uses a high-speed "fast packet" or "cell relay" method of switching and transport to transmit information in the form of short, fixed-length "cells" across both private and public networks by reference to "virtual path" and "virtual channel" ("VPI"/"VCI") addresses contained within the cells (i.e., "asynchronously"), rather than by reference to a fixed timing event (i.e., "synchronously"). The chief benefits of ATM are its ability, through the technique of statistical multiplexing, to provide increased effective bandwidth, i.e., "bandwidth on demand," for "bursty," asynchronous types of data traffic, while at the same time delivering the traffic at specific Quality of Service ("QoS") levels.

The term "SDH" refers to the international "Synchronous Digital Hierarchy" standard defined by the ITU for the synchronous high-speed switching, add/drop multiplexing, and transmission ("STM") of digital signals, including synchronous, plesiochronous, and asychronous signals, over optical core networks. The equivalent North American (ANSI) standard is referred to as the Synchronous Optical Network ("SONET") standard, and currently contemplates effective transport rates of from 51.84 megabits per second (Mbps) ("OC-1"), up to 9.953 gigabits per second (Gbps) ("OC-192"), over an optical fiber medium typically deployed in "ring" architectures located in network core "backbones." While the SDH and SONET standards are not identical, they are substantially similar in many respects, and unless expressly stated otherwise herein, the discussions contained herein should be understood to apply equally to both transport mechanisms.

However, certain concerns exist regarding the "all traffic/ATM/SONET" model as it pertains to certain types of traffic. In particular, questions exist regarding the efficiency of ATM-izing legacy voice and real-time video traffic, which are inherently isochronous or plesiochronous in nature, and therefore sensitive to transmission delay, or "latency," and which have long been implemented at the SONET, or "line," level using well understood and widely deployed Time Division Multiplexing ("TDM") protocols and line switching equipments. The primary benefit of ATM, statistical multiplexing, is not available with such types of traffic, and indeed, the processing overhead added by ATM-izing TDM types of traffic (e.g., by "circuit emulation" techniques) can more than offset the effective increased bandwidth benefit otherwise afforded by ATM, and with no gain in the level of QoS afforded to such traffic.

A second concern relates to the rapid increase in the number of users connecting to the world's largest WAN, viz., the Internet, and the concomitant annual growth rate in the traffic carried on it, including the emergence of "real-time" applications, including voice and streaming video. Thus, while telephony traffic is growing at a rate of less than 10% a year, data traffic, particularly Internet Protocol ("IP") traffic, and the related carrier revenue, is growing at a rate of better than 1000% per year, causing some to predict that IP traffic will soon dominate fiber networks, and that IP, not ATM, will become the "convergence layer" of choice.

But TDM and ATM are both "connection-oriented" protocols, i.e., both contemplate the establishment of an actual or a "virtual connection" ("VC"), whether permanent or temporary (i.e., switched) in nature, connecting two end-users together on the WAN before information can be exchanged between them. However, the "layer 3" (i.e., the "Network Layer") protocol, IP, for managing packet ("datagram") flows between the respective network hosts of two users, is "connectionless," i.e., the routing of packets is by intermediate packet switches (called "routers"), each of which individually and independently determines the appropriate "next hop" for forwarding the packets toward their ultimate destination without regard to any explicit, predetermined route. To accomplish this, each of the intermediate routers is obliged to run a "network layer routing algorithm," involving the execution of many lines of code, on the "header" of each IP packet, which places a substantial processing burden on the router, thereby limiting its effective bandwidth.

While it is possible to ATM-ize IP traffic using, e.g., the "Classical IP and ARP Over ATM" protocol promulgated by the Internet Engineering Task Force ("IETF") in its Request for Comments ("RFC") No. 1577, this method creates some additional problems, viz., it does not allow "multicast" traffic, it can carry only IP traffic and not any other internetworking protocol traffic, and ultimately, it does not resolve the "router bottleneck" problem described above.

It is also possible to bypass ATM altogether and send IP traffic directly over SONET, at a substantial gain in bandwidth, using the "Packet Over SONET" ("POS") protocol defined in IETF RFC Nos. 1661/1662/1619. The POS protocol is a "layer 2" (i.e., "Data Link" layer) protocol that maps IP and other types of data packets directly into SONET/SDH frames, and can be thought of as a replacement for the ATM "Adaptation Layer 5" ("AAL5"), without the cost of ATM's "segmentation and reassembly" ("SAR") process. In the POS protocol, IP packets are first "encapsulated" with the "link access" Point-to-Point Protocol ("PPP") of RFC 1661, then "framed" using the High-level Data Link Control ("HDLC")-like protocol of RFC 1662, and finally, mapped byte-synchronously into the SONET SPE in accordance with the "PPP over SONET" standard of RFC No. 1619.

However, POS also has a number of drawbacks. In particular, PPP only operates over a single, point-to-point link, and not over networks comprising multiple intermediate nodes deployed in rings or meshes. Further, it has no addressing, routing, flow control, or QoS capabilities. It is therefore desirable to have some "adaptation layer" situated between the IP network layer and the POS layers that provides some degree of control over addressing, routing, flow, and QoS.

Such an intermediate layer may be found in the IETF's RFC No. 3031 pertaining to a "Multiprotocol Label Switching" ('MPLS') Architecture." Sometimes referred to as "tag switching," the MPLS protocol maps layer 3 traffic to connection-oriented layer 2 transport mechanisms, and involves attaching a "tag," or "label," containing specific routing information to each IP (or other "connectionless") packet. This label enables the intermediate routers, called "label switching routers" ("LSRs") to assign explicit, predetermined paths to various classes of traffic, called "forward equivalence classes" ("FECs"), by reference to an entry in a pre-provisioned look-up table, called a "Next Hop Label Forwarding Entry" ("NHLFE"), thereby relieving each intermediate router of the need to run its own layer 3 routing algorithm in order to forward the packet.

Besides relieving the IP "bottlenecking" problem described above, MPLS also has other benefits: 1) Its techniques are not limited to IP, but are applicable to any Network Layer (i.e., packet-switching) protocol, including ATM, frame relay, Ethernet, Token-Ring, and others; 2) it enables legacy ATM switches to function as LSRs by simply encoding the switching labels into the "input port" and VPI/VCI packet header fields used by the switches to cross-connect the packets to the appropriate output port and VPI/VCI values; and, 3) it enables "connectionless" IP traffic to be treated as "connection-oriented" traffic, at least at the path level.

This last benefit also makes possible some additional and future dividends with respect to IP traffic: 1) It permits IP traffic to incorporate some Quality of Service ("QoS") features not available with the current version of IP (i.e., version 4); 2) it provides a migration path to possible IP- or packet-dominated network architectures of the future, e.g., "packet-over-fiber/direct λ," in which many of the equipment and functions necessary at the IP/ATM/SONET/DWDM level, and which also involve significant technical and cost penalties, become redundant, and can therefore be eliminated; and, 3) it permits a "protection/restoration" scheme, i.e., a mechanism for protecting traffic flow in a network against defects in the fabric of the network, such as a break in a fiber, to be implemented in a "hybrid" access-and-transport system, such as the "C7" system described below, which is not otherwise feasible with the network protection/restoration schemes of the prior art.

In light of the foregoing considerations, the assignee hereof has developed a novel, multi-functional, "hybrid" access-and-transport system, called the "C7" system. The C7 system is capable of supporting a wide variety of user interfaces in terms of bandwidth, density, interface, and application. It is a "hybrid" system, in that it is capable of gathering user traffic of any kind, including analog "Plain Old Telephone Service" ("POTS"), TDM, and packet traffic, including IP traffic, then "grooming" that traffic, to the extent necessary, into three basic types, viz., 1) TDM traffic, including voice and video, 2) ATM traffic, and 3) label-switched packet, or POS traffic, and then transporting the groomed traffic over a suitable broadband WAN transport backbone, including, but not limited to, a SONET backbone.

In a "C7 over SONET" system, bandwidth management is accomplished initially at the STS-1 level, in which STS-1 payloads can be "concatenated," or joined together, in groups of, e.g., 3, 12, 48, 192 STS-1 increments, for higher level signals, and for the TDM traffic component, at the VT level within the individual or concatenated STS-1s. Thus, for example, with an OC-3c interface, which consists of 3 STS-1s, or SPEs, both ATM and LSPOS traffic are respectively mapped into each of two of the SPEs, while TDM traffic is multiplexed into 28 VTs in the third one of the SPEs.

A schematic representation of one possible embodiment of a C7 system 100 of the type to which the Optical Mesh Restoration Protocol ("OMRP") method of the present invention is well adapted is shown in FIG. 1. The particular system 100 comprises four "shelves," or edge nodes 102, interconnected with optical fibers in a WAN in which the core of the WAN is deployed in the form of a ring arrangement 104. A C7 system 100 includes at least two of such nodes 102 disposed at different locations on the network, and can be deployed in a wide variety of other configurations, as discussed in more detail below. Additionally, two or more of the nodes 102 can connected together in a "rack" at a single location to aggregate higher levels of traffic.

In the embodiment illustrated, the system 100 provides broadband access to, e.g., the users in a first local area network ("LAN") 106 connected to the system through a first router 108 and/or a bridge 110, to access such services as, e.g. an internet service provider ("ISP") 112, connected to the system through a second router 114, and/or to the users of a second LAN 116 that is connected to the network by, e.g., an ATM switch 118. Voice traffic access, in the form of "Plain Old Telephone Service" ("POTS")/PBX 120, or a T1/T3 connection 122, is also available, as are TDM or packetized real-time video applications 124.

Each of the nodes 102 comprises a plurality of line units 126 and at least one pair of "Routing and Arbitration Processor" ("RAP") units 130A and 130B. The line units 126 serve to receive and groom the user's respective types of traffic prior to its insertion onto the WAN backbone 104 by the RAPs 130A, 130B, in the manner outlined below. The line units 126 thus cooperate with the RAPs 130A, 130B to provide access to the transport core 104 of the WAN to the users, each of whom has subscribed to a particular type of service at a particular "sustained information rate" ("SIR") and at a particular QoS level.

Figure 2:
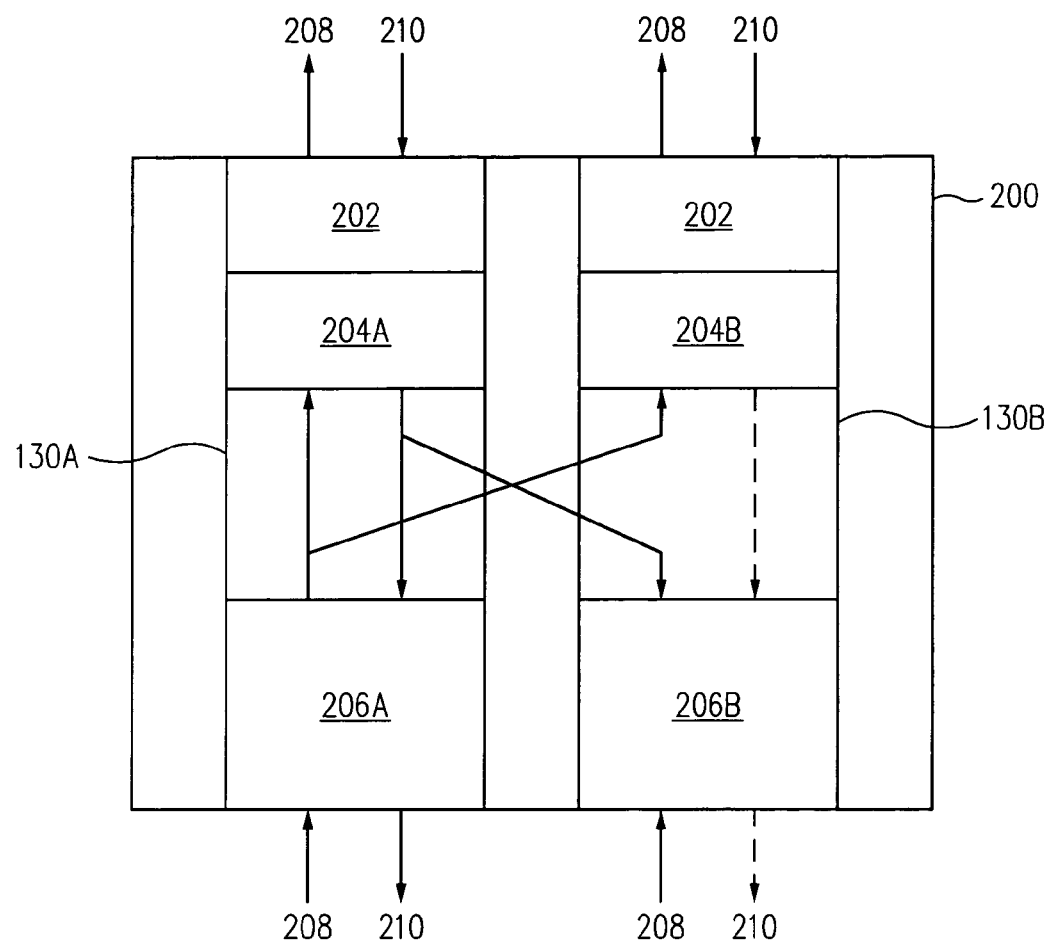
FIG. 2 is a schematic representation of a portion of a node, or "shelf," of the hybrid system shown in FIG. 1 illustrating the flow of traffic through two routing and arbitration processors ("RAPs") located therein.

FIG. 2 schematically illustrates a portion 200 of one of the "shelves," or "nodes" 102, of the hybrid C7 system 100 illustrated in FIG. 1, and in particular, the at least two RAP units 130A and 130B. As shown in FIG. 2, each RAP unit 130A and 130B comprises a signal interface or transducer 202A or 202B, which can be fiber-optical, e.g., an OC-12 interface, or "copper," e.g., a DS-3 interface. Each RAP 130A and 130B further includes a proprietary "Gigapoint Access Processor" ("GAP") 204A or 204B, and a proprietary "Gigapoint Routing Cross-connector" ("GRX") 206A or 206B. The two GRXs 206A and 206B are each connected to a proprietary, high-speed, serial "Gigapoint Bus" (not illustrated in FIG. 2) in each shelf, or node 102, that serves as the interface between the RAPs 130A and 130B and the user interface line units 126 (not illustrated in FIG. 2) contained in the shelf.

Each of the two RAPs 130A and 130B processes groomed, outgoing traffic 208 aggregated from the line units 126, and transports, or "scatters," it over the WAN, and simultaneously (i.e., in "full duplex" operation) receives high level incoming traffic signals 210, "de-aggregates" (i.e., de-multiplexes) the signals into lower order signals, and drops the lower order signals off to the respective line units 126 for conversion into a native format and distribution to the individual users. Thus, in view of the traffic mix of the C7 system 100 discussed above, it may be seen that each of the RAP units 130A and 130B functions as a combination of a SONET/SDH add/drop multiplexer, a high-speed ATM switch, and a Label Switching Router ("LSR").

As those of skill in the telecommunication art will appreciate, it is necessary for economic reasons to provide some form of "protection" for the traffic carried within any complex broadband access and transport system, such as the hybrid C7 system described above, i.e., some method for quickly "healing," or restoring, the system mesh in the event of an equipment failure or other problem in the transport media, such as a break in a fiber.

Most network protection/restoration schemes generally involve the provision of bandwidth "redundancy," and in particular, establishing at least two independent and physically diverse "lines" or "paths," respectively called an "active" or "working" line or path, and a "protect" line or path, connecting a given sender to a given receiver on the network, and then switching, i.e., "path switching" and/or "line switching" traffic between the lines and/or paths to avoid a failed network element occurring along one of the lines or paths. In one mode of operation, called "bridged," or, in a linear chain, "1+1" (or "one plus one") protection, protected traffic is "mirrored," i.e., sent in parallel along both the active and protect lines or paths, and in the event of an interrupted signal, the receiver selects the traffic from the uninterrupted line or path to "restore" the flow of traffic in the system.

In another possible mode of operation, called "un-bridged," or in a linear chain, "1:1," (or "one-for-one") protection, bandwidth in an amount equal to that of the protected traffic is reserved on the protect line or path, and in the event of an interruption in the protected line or path, the protected traffic is switched into the reserved bandwidth on the protect line or path. Un-bridged operation permits the "re-use" of reserved bandwidth by senders and receivers located between the protected sender and receiver, as well as the transmission of low priority, "unprotected" traffic in the reserved bandwidth that can be dropped in the event of a protection event, whereas, bridged operation does not permit either efficiency.

Conventional access and transport systems incorporating SONET cores are typically deployed in ring architectures for network protection and restoration reasons. In a "Unidirectional Path Switched Ring" ("UPSR") configuration, a single optical fiber pair connects adjacent "nodes" deployed in a ring configuration. Primary path traffic travels in only one direction around the ring, and on the same fiber, and protect path traffic travels around the ring in the opposite direction on the other fiber. In the event of a failure in one or both fibers between adjacent nodes, each of the nodes either transmits and/or receives traffic on different fibers. Because protection switching is effected independently for each path, the method is referred to as "path switching," and because the flow of traffic is in only one direction, the method is referred to as "unidirectional."

In a two-fiber bi-directional line switched ring ("BLSR"), two pairs of optical fibers connect adjacent nodes, up to a maximum of 16, and primary traffic is transmitted bi-directionally around the ring on each pair. Since one pair cannot be reserved exclusively for "protect" capacity, half the bandwidth capacity of each pair is reserved for protect traffic. In the event of, e.g., a fiber cut in one of the pairs, the traffic between disconnected nodes is switched, i.e., mapped, into the reserved bandwidth in both pairs in the uncut portions of the ring. Since the bandwidth on the fibers between affected nodes are rerouted as a group, the restoration operation is referred to as "line switching," and since the forward and return paths are on the same link, the operation is referred to as "bi-directional."

Four-fiber BLSRs are similar to two-fiber BLSRs, except that two bi-directional fiber pairs are provided between adjacent nodes. An interrupted fiber results in both active pairs of fibers being switched to a protect fiber pair flowing in the opposite direction around the ring. Since no protect bandwidth need be reserved on the active pairs of fibers, four-fiber BLSRs have twice the bandwidth of two-fiber BLSRs, but are also relatively more expensive to implement.

A hybrid system, i.e., one that can support TDM, ATM and MPLS packets, and in particular, IP packets, such as the C7 system, can implement either a line switching internal protection method or a path switching internal protection method. However, while a line switching protection method is easier to implement in a hybrid system, a path protection method provides more overall protection coverage, and hence, is preferable to the former.

One possible internal path protection method for a hybrid equipment is the conventional STS/VT path protection method. However, this method, when implemented in a hybrid system, does not permit the system to take full advantage of the statistical multiplexing capabilities provided by packet technologies. A need therefore exists for a new path protection method for a hybrid equipment that takes full advantage of both the statistical multiplexing capability provided by packet (i.e., ATM, MPLS, IP) switching technology, as well as the "self-healing" properties of a ring topology, yet one which can also support conventional TDM traffic without requiring the latter type of traffic to be "packetized."

The novel Optical Mesh Restoration Protocol ("OMRP") described herein fully satisfies the foregoing need, and is well adapted to provide internal protection to a hybrid access and transport system, such as the C7 system described above. The OMRP supports a mix of both TDM and packet traffic without the complexity of a so-called "multi-layered" method that necessitates supporting two different path protection schemes at the same time. Since OMRP is modeled on the idea of "Virtual Path" ("VP") rings, it provides the advantages of VP rings, viz., the ability to support statistical multiplexing, as well as self-healing rings. Moreover, as discussed below, the OMRP method is independent of the transport layer, and can thus be used protection/restoration over different transport layers, e.g., direct λ, as well as over equipments that use multiple transport layers, e.g., both SONET/SDH and direct λ.

Figure 3:
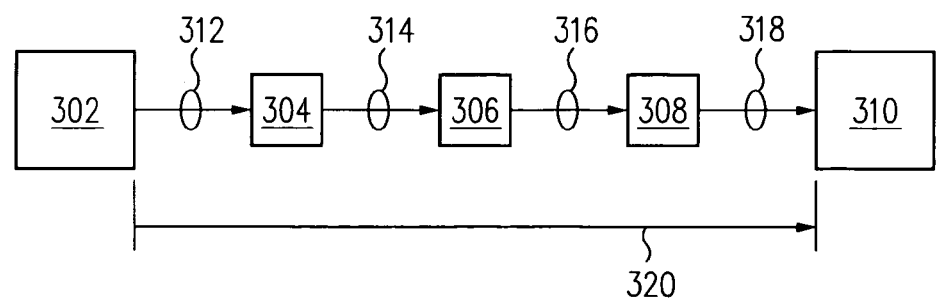
FIG. 3 schematically illustrates a "Label Switched Path" ("LSP") defined between an ingress node and an egress node by the flow of label-switched packet traffic therebetween.

One of the bases upon which the OMRP protection/restoration method is predicated is illustrated in FIG. 3. In FIG. 3, an MPLS-capable traffic "ingress" node 302, acting as a router, is shown sending a label-switched "flow" of packet traffic, e.g., IP traffic, through intermediate nodes 304, 306, 308, each acting as a label-switching router ("LSR"), to a traffic "egress" node 310.

As discussed above, each flow of the traffic between the successive nodes 302, 304, 306, 308, 310 is "tagged," or labeled, with a unique label 312, 314, 316 and 318 that identifies each flow between two adjacent nodes as a member of a particular "forward equivalence class" ("FEC") directed to a particular, next-succeeding, or "downstream," LSR. Each downstream LSR forwards the traffic to the next-succeeding downstream LSR by simply matching the label to an entry in the NHLFE look-up table previously provisioned therein, and then following the forwarding directions associated in the table with that entry. Full duplex MPLS communication between the two end nodes 302 and 310 would result in second flow of MPLS traffic in the opposite direction.

Of importance, it should be noted in connection with FIG. 3 that IP is inherently a "connectionless" protocol, and accordingly, would ordinarily follow an indeterminate, "best effort" route between the ingress node 302 and the egress node 310. However, when the MPLS protocol is applied to the flow of traffic as described above, the individual FECs between succeeding nodes join together in an explicit, deterministic "Label-Switched Path" ("LSP") 320 between the ingress node 302 and the egress node 310, and accordingly, MPLS-switched packets can be treated as "connection-oriented," at least at a path level. The LSP 320 is analogous in nature to a VT, in the case of TDM traffic, and to a VP, in the case of ATM traffic, and it is possible to posit a pure MPLS packet network path protection/restoration protocol along lines analogous to those developed for respective ones of the former types of traffic.

Figure 4:
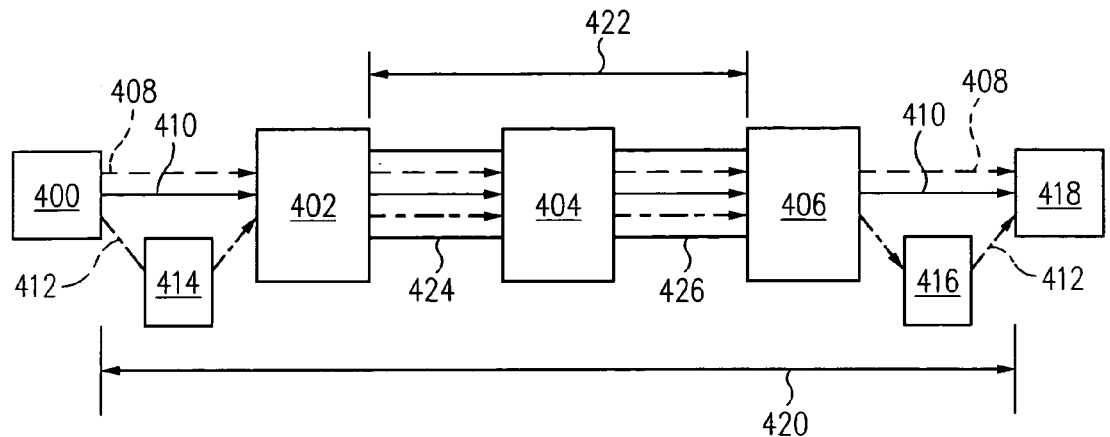
FIG. 4 schematically illustrates a flow of hybrid traffic between two users of the hybrid system in which a traffic "Virtual Flow" ("VF") is defined between an ingress and an egress node by the flow of the hybrid traffic therebetween.

The foregoing concept is further extended in FIG. 4, wherein a sending user 400 at one end of a linear network comprising an ingress node 402, an intermediate node 404, and an egress node 406, is shown sending a hybrid traffic mix, consisting of ATM traffic 408 (shown by a dashed line), TDM traffic 410 (shown by a solid line), and IP traffic 412 (shown by a phantom line) passing through ingress and egress routers 414 and 416 respectively, to a receiving user 418 at the end of the network. As in the above discussion, only unidirectional (i.e., "simplex") communication between the sending user 400 and the receiving user 418 is shown and discussed, but the concept is equally applicable to simultaneous bi-directional (i.e., full duplex) communication, as well.

In such an arrangement as is shown in FIG. 4, a "Virtual Connection" or "Virtual Circuit" ("VC") 420 can be defined that connects the sending user 400 to the receiving user 418 with respect to the ATM traffic 408 and the TDM traffic 410, because both of these traffic protocols are connection-oriented. However, no such VC exists between the users 400 and 418 with respect to the IP traffic 412, because the IP traffic is connectionless, at least between the sending user 400 and the ingress node 402 at one end of the network, and between the egress node 406 and the receiving user 418 at the other end of the network.

However, assuming the nodes 402, 404, and 406 are MPLS-capable, and by reference to the LSP 320 of FIG. 3 discussed above, it may be seen that, with respect to the "internal" portion of the network, i.e., that portion extending between the ingress node 402 and the egress node 406, a single "Virtual Flow" ("VF") 422 of traffic can be defined, consisting of VF "links" 424 and 426, that contains all three of the individual virtual flows of traffic 408, 410, and 412. The VF 422 is a "path-like" entity, and indeed, has the characteristics of a VT for TDM traffic, a VP for ATM traffic, and an LSP for MPLS traffic.

Figure 5:
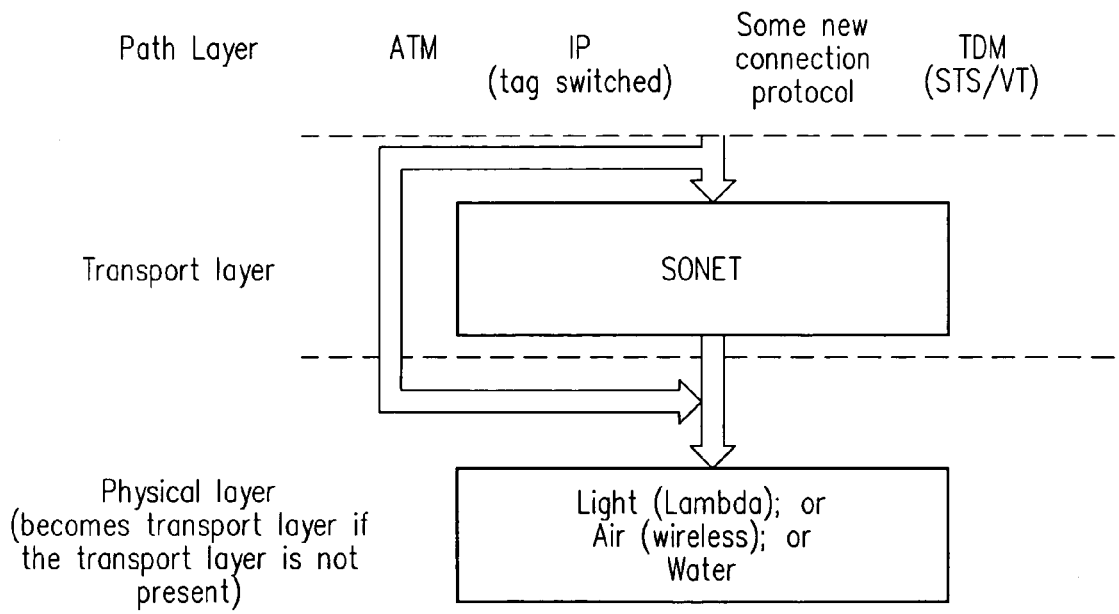
FIG. 5 is a schematic illustration of the functional layer architecture of the hybrid system.

This "confluence" of hybrid traffic flow control at the "path" layer is schematically illustrated in FIG. 5, and is made possible by the fact that the application of the MPLS protocol enables connectionless traffic, e.g., IP traffic, to be treated like connection-oriented traffic, e.g., TDM and ATM traffic, at least at the path layer, if not at the higher VC layer. One result of this confluence of flow control at the path level is that a robust, efficient path switching (or "flow switching") protection/restoration protocol, viz., the OMRP described below, can be predicated for a hybrid system, such as the C7 system, that combines the statistical multiplexing capability provided by packet (i.e., ATM, MPLS, IP) switching technology, as well as the "self-healing" properties of a ring topology, yet one which can also support conventional TDM traffic without first packetizing it.

FIG. 5 also demonstrates two other advantages of the OMRP method: 1) Since the method is effected at a single layer, viz., the path layer, it is a much simpler method to implement than the complex multi-layered methods of the prior art; and, 2) since it is implemented at a layer above the "transport" layer, e.g., the SONET layer illustrated, the OMRP method is independent of the transport mechanism, so that it is extensible to any transport mechanism and physical medium, including, e.g., Gigabit Ethernet, direct λ, and wireless, microwave, or even water.

The OMRP method includes the provisioning of at least two (four for full duplex operation) Virtual Flows ("VFs") of hybrid traffic between each pair of ingress and egress ("I/E") nodes in the system, as described above. The at least two VFs are provisioned such that each VF takes a different physical path, e.g., a different fiber, than that taken by the other VF between the two I/E nodes. The VFs that take the same physical path, e.g., the same fiber, between the I/E nodes are then respectively grouped into a respective one of two "Path Protection Groups" ("PPGs"), one termed a "working," or "active" PPG, and the other a "protect" PPG. Each of the two PPGs has a dedicated "Management Control Flow" ("MCF") provisioned within it that is carried in the respective VFs contained therein.

The MCFs are similar to the "Operations, Administration, and Maintenance" ("OAM") channels in pure STS/VT systems, and the OAM flows (i.e., "F1–F5") in pure ATM systems, respectively, and take the same form as that of the particular traffic being protected. Thus, the MCF for protected TDM traffic takes the form of a TDM channel, i.e., a fixed bandwidth channel that uses either some unused (spare) bytes in the path overhead, or a low bandwidth TDM channel in the regular data payload of the SPE. The MCF for ATM traffic takes the form of 53 Byte ATM cells, the MCF for MPLS traffic takes the form of variable-length, labeled packets, and the MCF for a hybrid VF includes all three types of digital structures.

Thus, in an STS/VT-based SONET system, the MCFs for TDM traffic can occupy spare bytes in the Path Overhead ("STS-POH" or "VT-POH") structures of the SPE, which means that the MCFs for TDM traffic do not exact any "overhead penalty" from the SPEs. However, the MCF structures for both ATM and MPLS traffic do utilize a small fraction of the payload envelope as low-bandwidth path overhead.

The MCFs are used to communicate a protection switching signal ("PSS") to the affected Protection Switching Entities ("PSEs") in the system, which in the OMRP method, are either the Egress nodes acting alone, or both the Ingress and the Egress nodes acting in paired concert with each other. However, as discussed below, the nodes that detect the failure and communicate the PSS to the affected PSEs over the MCFs may be intermediate nodes that are otherwise unaffected by the failure.

In one embodiment, called "hop-by-hop" provisioning, the system operator manually provisions the VFs between the respective I/E node pairs along the explicit path that the traffic flow between them is required to take by programming each intermediate node located along the path with the VF and MCF information. This "hop-by-hop" provisioning is analogous to the manner in which Permanent Virtual Connections are provisioned in a pure TDM or a pure ATM system.

In another possible embodiment, the VFs are provisioned between two I/E nodes in an "A–Z" method in which the system operator provides the traffic parameters between specific I/E node pairs, and in which the system itself then automatically provisions the VFs between the two I/E nodes. The A–Z method is analogous to the provisioning of Switched Virtual Connections in pure TDM or ATM systems, and to the effectuation of a "label distribution protocol" ("LDP") in a pure MPLS system.

In both the hop-by-hop and the A–Z provisioning methods, the values for each PPG's MCF are dynamically assigned by a connection control subsystem located in the ingress node that processes the MCF provisioning request, and in both methods, both of the I/E nodes, as well as each intermediate node between the two I/E nodes, is programmed to be "aware" of each VF originating, terminating, or passing through it, including the number of the associated PPG and the MCF for that PPG.

The OMRP method further involves the detection of any interruption or fault in the flow of traffic transported in an "active," or "working," PPG, which is effected by the nodes immediately "upstream" and "downstream" of the fault or interruption, respectively. A fault may include an accidental break in a fiber (e.g., so-called "backhoe fade"), but may also include any loss of signal ("LOS"), loss of framing ("LOF"), or a situation in which either the line and/or the path bit error rate ("BER") exceeds a certain threshold value.

When such a fault in the protected traffic in an active PPG is detected, the method includes the generation of a PSS by the nodes detecting the fault, and the transmission of that signal along the MCF of the affected PPG to the relevant "protection switching entities" ("PSEs"), viz., the I/E nodes themselves, which then either switch receipt of the affected traffic, or both the transmission and receipt of the affected traffic, from the affected "active" PPG to the associated "protect" PPG to thereby restore path and signal continuity within the system.

In addition to the above "active" PPG fault-detection and restoration features, the OMRP method of the invention also includes detection of any fault or interruption in the flow of traffic transported in a "protect" PPG. This is particularly advantageous in systems in which failures of more than one type, and of a type that can be detected at a node, can occur, e.g., both a complete signal failure (LOS), and/or a less-severe signal degradation in, for example, a SONET/SDH network. In such a system, the OMRP enables the failures to be "ranked" in order of their severity, and in the event of a fault being present on both the "working" and the "protect" paths, enables the relevant PSEs to "select" the path with the less severe fault in a "best-possible protection" solution.

Further, the OMRP method gives the system operator powerful "override" control capabilities. Thus, with the OMRP, the operator has the ability to "force" the traffic on to either the "working" or the "protect" side through a manually initiated command to the relevant PSEs, regardless of whether or not there is a fault on either path. The behavior of the OMRP in such an operating scenario is substantially similar to that in which there is a fault present on the path being switched away from, as described in more detail below.

The following discussion describes the operation of the OMRP method in a hybrid system, such as the C7 system, as deployed in only some of the many possible network configurations in which it can be implemented.

Figure 6A:
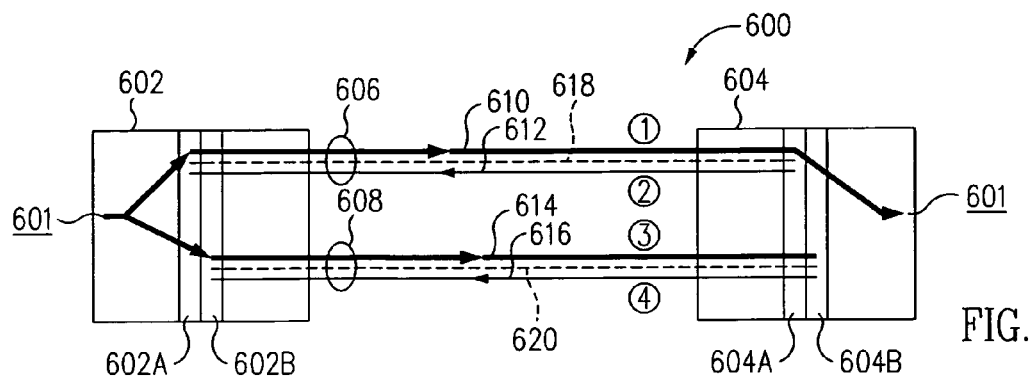
FIG. 6A is a schematic representation of a hybrid system deployed in a bridged, point-to-point configuration during normal operation.

FIG. 6A schematically illustrates a hybrid system 600 comprising a pair of I/E nodes 602 and 604 implementing the OMRP method of the invention and deployed in a simple, bridged (or "1+1"), point-to-point topology. The line units through which each of the respective I/E nodes 602 and 604 interface with their respective end users are omitted for clarity. Each of the nodes 602 and 604 respectively includes an "active" RAP 602A or 604A, and a "protect" RAP 602B or 604B, as described above. In normal, "bridged" operation, the Ingress node 602 sends hybrid traffic flow 601 over both the "active" and "protect" links (e.g., optical fibers) ① and ③, with the protect traffic on the protect link ③ identically mirroring the active, protected traffic on link ①. The Egress node 604 samples the traffic that it receives over both of the links ① and ③ with respective ones of its active and protect RAPs 604A and 604B, and selects the traffic received over the active link ①.

Since the traffic between the Ingress node 602 and the Egress node 604 flows over two distinct physical paths, or links, two "Path Protection Groups" ("PPGs") 606 and 608, each comprising a respective pair of hybrid "Virtual Flows" ("VFs") 610 and 612, or 614 and 616, respectively, as well as two "Management Control Flows" ("MCFs") 618 and 620 (represented by dashed lines), each carried in a respective one of the two pairs of VFs, can be provisioned between the two nodes in accordance with the OMRP method. The VF 610 is characterized as the "working," or "active," or "protected" VF, and the VF 614 is characterized as the "protect," or "standby" VF, and the two PPGs, viz., the "active" PPG 606, and the "protect" PPG 608, derive their respective names from the character of the respective VFs contained therein.

Figure 6B:
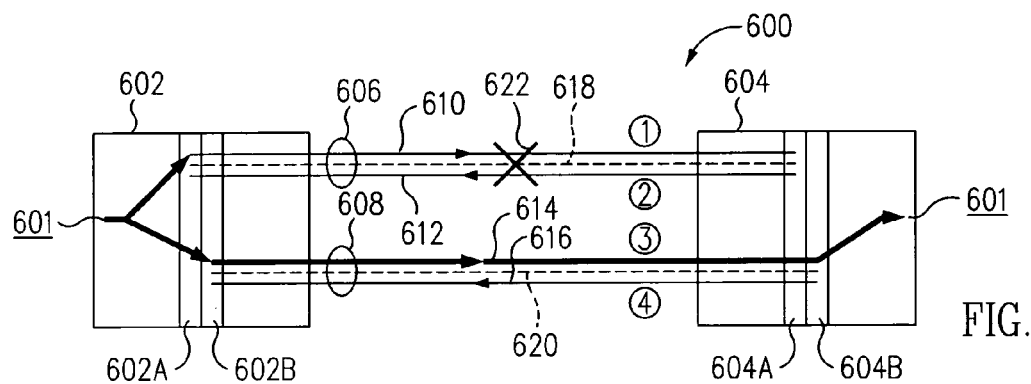
FIG. 6B is a schematic representation of the bridged, point-to-point hybrid system shown in FIG. 6A after a traffic flow failure and restoration thereof in accordance with the OMRP method of the present invention.

As illustrated in FIG. 6B, when a "link failure," such as a break 622 in a fiber, occurs in the "active" optic links, i.e., links ① and ② of the system 600, the traffic 601 from the Ingress Node 602 to the Egress node 604 reaches the latter node only on the "protect" link ③.

In accordance with the generalized operation of the OMRP method, each of the nodes immediately "upstream" and "downstream" of the fault 622 in the active links, respectively, experiences a loss of signal ("LOS") on the active PPG 606, i.e., acts as a "detector node" with respect to the fault 622. Responsively, each of the fault detecting nodes 602 and 604 sends a Protection Switching Signal ("PSS") on each MCF of each PPG, i.e., both active and protect PPGs, that pass through it on the failed link, i.e., those PPGs that neither originate nor terminate in that fault detecting node. Thus, ordinarily, node 602 would send a PSS on the MCF 618 of the PPG 606 (the only PPG passing through the failed links ① and ②) to all of the nodes "upstream" of it, and node 606 would ordinarily send a PSS on MCF 618 to all of the nodes "downstream" of it, advising them of the occurrence of the fault 622. Additionally, each of the detecting nodes would ordinarily determine whether it were a "terminating" node with respect to the traffic carried in the affected PPG(s), and if so, would effect a protection switch to receive the interrupted traffic on the protect link, rather than the working, or active link.

However, in the simple, two-node, bridged scenario illustrated in FIGS. 6A and 6B, the entities that detect the fault 622, i.e., the nodes immediately upstream and downstream of the fault, also correspond to the "Protection Switching Entities" ("PSEs") of the system 600, i.e., the protected traffic VF 610 originates in the Ingress node 602, and terminates in the Egress Node 604, and there are no other nodes upstream, downstream, or intermediate of these two nodes. Accordingly, each of the PSEs is immediately aware of the failure, as described below, and the upstream/downstream transmission of a PSS over the MCF 618 of the PPG 606 therefore becomes unnecessary and redundant in this simple network. However, as discussed in some of the examples below, the affected PSEs do not always correspond to the "fault detecting entities," and as a result, are not always aware of the occurrence of a fault, and consequently require a PSS to effect the appropriate protection switching to restore the traffic in the network.

Thus, in the simple system 600 illustrated in FIG. 6B, the Egress node 604 immediately detects the resulting LOS on its "active" RAP 604A, without the need for a PSS to "advise" it thereof, and responsively, switches its signal reception (i.e., it executes a "local receiver link switch") to the "protect" RAP 604B contained therein, thereby restoring traffic and signal flow to the Egress node 604. (In full duplex operation, the Ingress node 602 likewise detects a LOS and effects a similar switching action with respect to the traffic terminating in itself, without the need for a PSS, i.e., to receive the interrupted "return" traffic VF 612 from the Egress node 604 on its protect RAP 602B over the "protect" link ④.)

Figure 7A:
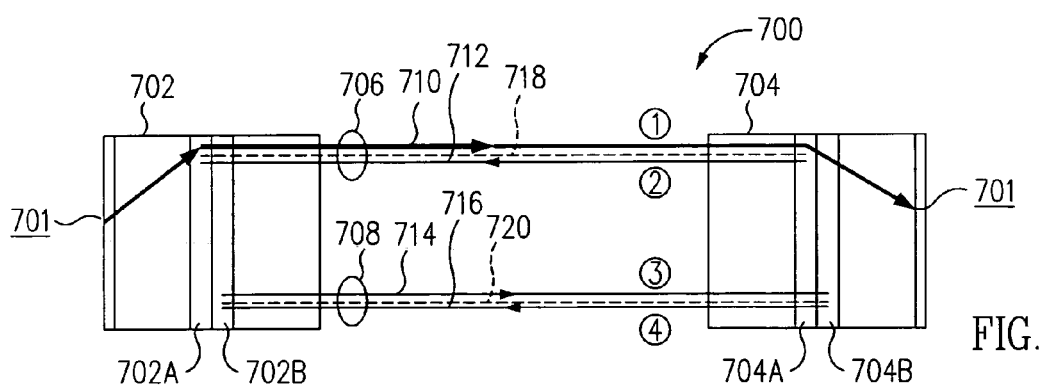
FIG. 7A is a schematic representation of a hybrid system deployed in an un-bridged, point-to-point configuration during normal operation.

FIG. 7A schematically illustrates a hybrid system 700 comprising a pair of I/E nodes 702 and 704 implementing the OMRP method of the invention and deployed in a simple, un-bridged (or 1:1), point-to-point topology. Thus, the network 700 in FIG. 7A is similar to the system 600 discussed above and illustrated in FIG. 6A, except that it is operated in an "un-bridged" mode. In normal, unabridged operation, protected hybrid traffic 701 flows from the Ingress node 702 to the Egress node 704 only on the active links ① and ②. No protected traffic flows in the protect, or "standby" links ③ and ④, and instead, bandwidth, in an amount equal to that of the protected traffic on the active links, is reserved on the protect links to carry the protect traffic in the event of a failure. However, as discussed above, the protect links can also carry unprotected, low priority traffic in this reserved bandwidth, which will be discarded, or "dropped," in the event of a failure.

As in the bridged embodiment in FIGS. 6A and 6B above, two PPGs 706 and 708, each comprising a respective pair (in duplex operation) of active VFs 710 and 712, and a pair of protect VFs 714 and 716, and two associated MCFs 718 and 720, can be provisioned between the two I/E nodes in accordance with the OMRP method.

Figure 7B:
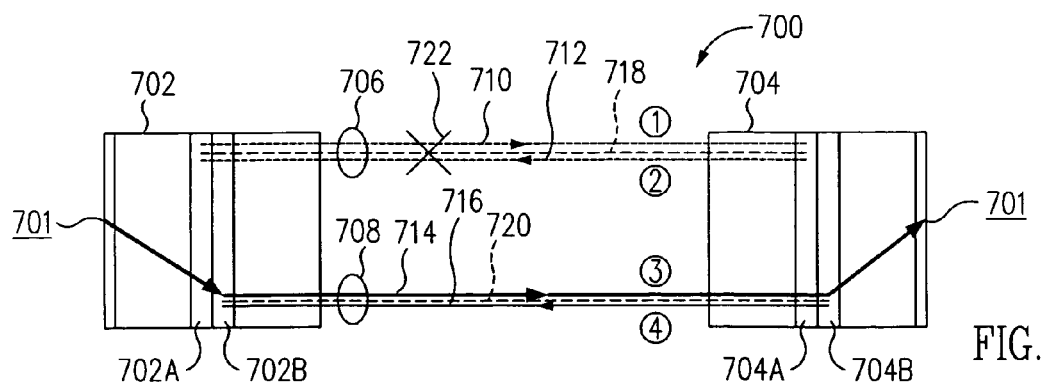
FIG. 7B is a schematic representation of the unabridged, point-to-point hybrid system shown in FIG. 7A after a traffic flow failure and restoration thereof in accordance with the OMRP method.

As illustrated in FIG. 7B, upon the occurrence of a failure in the active links ① and ②, such as a fiber break 722, each of the two I/E nodes 702 and 704 detects a LOS, and responsively, generates a PSS, which it transmits on the MCF 718 of the only PPG carried on the interrupted links ① and ②, viz., PPG 706, to other nodes upstream or downstream of the failure, respectively. Additionally, as above, in the generalized operation of the OMRP, each node 702, 704 determines whether it is a "terminating" node with respect to the interrupted traffic, and if so, effects a protection switch to receive the interrupted traffic on the protect PPG.

However, as in the above, bridged example, there are no other nodes upstream, downstream, or intermediate of the two I/E nodes 702 and 704, i.e., the fault-detecting nodes also correspond to the PSEs for the simple system 700. Accordingly, the step of generating a PSS and transmitting it in the MCF of the interrupted PPGs "collapses" into the simpler step of each of the I/E nodes 702 and 704 "advising" itself of the occurrence of the fault 722, and responsively effecting an appropriate protection switching of itself, as in the above, bridged system 600.

However, as highlighted in the example of FIGS. 7A and 7B, there is one important difference in the operation of the OMRP method in systems operating in a bridged mode, as illustrated in FIGS. 6A and 6B, and in systems operating in an un-bridged mode, as illustrated in FIGS. 7A and 7B, and indeed, is the only substantive difference in the operation of the OMRP in the two types of operating modes: In an un-bridged system, the OMRP includes an additional step to effect protection switching, viz., an "exchange" of Protection Switching Signals between the PSEs, i.e., the I/E nodes 702 and 704, which is sent on the MCF of the protect PPG 708, i.e., MCF 720, in which the two I/E nodes "agree" that the Ingress node 702 will transmit, i.e., will "re-address," or "re-map," the protected traffic flow VF 710 from the protected PPG 706, into the protect bandwidth reserved for it in the protect PPG 708, carried on the standby, or protect links ③ and ④, and the Egress node 704 will receive the protected traffic flow VF 710 therefrom. Thus, any unprotected traffic on the standby links is dropped, the protected traffic is switched into the reserved bandwidth of the protect PPG 708, from which the Egress node 704 receives it, and the flow of protected traffic through the system 700 is thereby restored.

It may be noted in the above examples that, although not explicitly described, the "return" traffic, i.e., the traffic originating in the Egress nodes and terminating in the Ingress nodes, is likewise protected by the OMRP method, such that operation of the OMRP mode is "symmetrical" with respect to all such traffic. That is, the Ingress nodes function as "egress nodes," and the Egress nodes function as "ingress nodes" with respect to such return traffic.

Thus, the respective active and protect return VFs that originate in the egress nodes and terminate in the ingress nodes, which might include VFs 612 and 616 in FIGS. 6A and 6B, and VFs 712 and 716 in FIGS. 7A and 7B, may be included in the respective active and protect PPGs 606, 608, and 706, 708, respectively, and thereby protected by the OMRP method, along with the traffic flowing from the Ingress nodes to the Egress nodes. However, the foregoing is not the case for "return" traffic that does not both originate in the Egress node and terminate in the Ingress node, i.e., traffic with respect to which either or both of the Ingress and the Egress nodes is acting as an intermediate, or a "pass-through" node.

It may be further noted in the following examples that, in the OMRP method, protection switching takes place along the entire path between the traffic source, or origination, and the traffic destination, or termination, end-point nodes, and not just between two adjacent nodes that detect the signal failure, as is the case in certain prior art "Linear Automatic Protection Switching" ("APS") standards. This difference is better illustrated in the following two examples.

FIG. 8A schematically illustrates a hybrid network 800 implementing the OMRP method of the invention and deployed in a bridged, point-to-point topology comprising a pair of I/E nodes 802 and 806 having an intermediate node 804 disposed between them. Each of the Ingress node 802 and the Egress node 806 is equipped with a respective active RAP 802A or 806A, and a respective protect RAP 802B or 806B, as above, whereas, the intermediate node 804 is equipped with two pairs of RAPs, viz., active RAPs 804A1 and 804A2, and protect RAPs 804B1 and 804B2.

In the network 800 illustrated, there are two "ingress" traffic flows, viz., ingress flow 808 entering at end node 802 and continuing through the intermediate node 804 to exit, or terminate, at node 806, and traffic flow 810 entering the system at intermediate node 804 and exiting at node 806, without passing through any intermediate nodes. Thus, both the end node 802 and the intermediate node 804 act as "ingress" nodes with respect to the end node 806, which acts as an "egress" node with respect to both of the former, whereas, node 804 acts as an intermediate, or "pass-through" node with respect to the traffic flow 808 from node 802 to node 806.

In accordance with the OMRP method, two PPGs can be provisioned that protect the traffic flow 808 from node 802 to node 806, viz., a "working" PPG 812, comprising active VF 814 from end node 802, carried via active link ③, and a "protect" PPG 818, comprising "protect" VF 820 from end node 802, carried via protect link ①. Also in accordance with the OMRP method, each of the PPGs 812 and 818 are provisioned to include a respective MCF 824 and 826, as above.

It may be noted from the above that the second ingress flow of traffic 810 originating in the intermediate node 804 is not included within the OMRP PPGs 812 and 818, and accordingly, is not protected thereby. However, if it were desirable to protect the flow of ingress traffic 810 from node 804 to node 806, then an additional pair of working and protect PPGs 832 and 834, each comprising a respective one of the active and protect VFs 816 and 822, could be provisioned in the system 800, in which the intermediate node 804 acts as an "ingress" node with respect to the traffic 810 and the Egress node 806. Thus, it may be seen that in the OMRP method of the invention, individual traffic flows are individually and independently protected on an individual, "I/E node-pair," basis.

During normal, bridged, operation, the "ingress" nodes 802 and 804 each respectively send identical traffic on both of the active and the protect links ③ and ①, respectively, and the common "egress" end node 806 samples the traffic on both links and selects the traffic on the active link ③.

As illustrated in FIG. 8B, in the event of a failure in the active link between the end node 802 and the intermediate node 804, such as the fiber break 828 illustrated therein, both the end node 802 and the intermediate node 804 node will immediately detect the failure as a LOS, and responsive thereto, each generates a PSS and respectively transmits it to any upstream nodes, and any downstream nodes, including the Egress node 806 on the MCF 824 of PPG 812, which is the only PPG passing through the failed fibers, indicating the occurrence of the failure 828.

In response to the PSS from the intermediate node 804, the Egress node 806, which is not immediately adjacent to the failure 828, and hence, not immediately "aware" of it, switches to receive on the protect link ①, but only to receive the traffic that was affected by the fiber break 828, viz., the protected VF 814 from the Ingress node 802. The traffic that was not on the failed path, viz., the traffic on the active VF 816 from the intermediate node 804, remains on the active link ③, and the Egress node 806 continues to receive that traffic on its active RAP 806A, as shown in FIG. 8B. Thus, in this example, while the intermediate node 804 participated in the protection switching event as a "fault-detecting entity," it was not obliged to engage in any switching activity itself, and was otherwise unaffected by the fault 828.

Figure 9A:
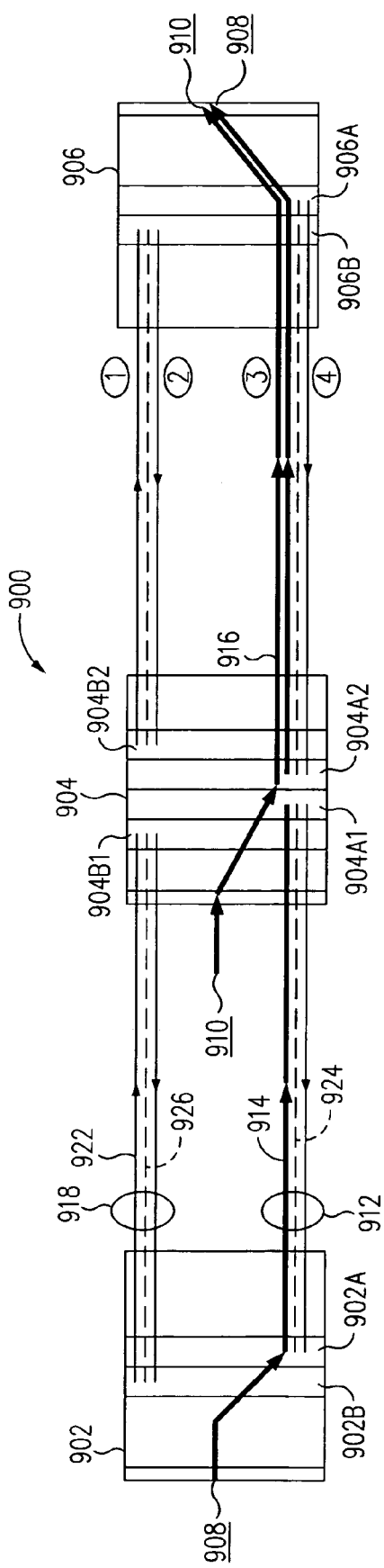
FIG. 9A is a schematic representation of a hybrid system deployed in an un-bridged, point-to-point configuration having an intermediate node during normal operation.

FIG. 9A schematically illustrates a hybrid network 900 implementing the OMRP method of the invention and deployed in an un-bridged, point-to-point topology comprising a pair of end nodes 902 and 906, with an intermediate node 904 disposed between them. Thus, the system illustrated in FIG. 9A is similar to that illustrated in FIG. 8A, except that the network 900 is operating in an un-bridged mode. As above, each end node 902 and 906 is equipped with a respective active RAP 902A or 906A, and a respective protect RAP 902B or 906B. The intermediate node 904 is equipped with two pairs of RAPs, active RAPs 904A1 and 904A2, and protect RAPs 904B1 and 904B2. As above, there are two ingress traffic flows, viz., the flow 908 entering at the end node 902 and continuing through the intermediate node 904 to exit at the end node 906, and the ingress traffic flow 910 entering at the intermediate node 904 and exiting at the end node 906 without passing through any intermediate nodes.

As described above in connection with FIGS. 8A and 8B, two PPGs are provisioned between the Ingress node 902 and the Egress node 906 that protect the traffic flow 908, viz., the PPG 912, comprising the active VF 914 from the Ingress node 902, carried on the active link ③, and the PPG 918, comprising the protect VF 922 from the Ingress node 902, carried on the protect link ①. Each of the PPGs 912 and 918 is provisioned to include a respective MCF 924 and 926, as above. Also as above, the traffic flow 910 is not protected by the PPGs provisioned for the traffic flow 908, but could be protected by another pair of PPGs (not illustrated) provisioned between the intermediate node 904 and the end node 906 if desired.

In normal, unabridged operation, protected hybrid traffic flows from the node 902 to the node 906 only on the active link ③. No protected traffic flows in the protect, or "standby" link ①. Instead, "protect bandwidth" in an amount equal to that of the protected traffic on the active link, i.e., in an amount equal that in the protected VF 914 from the end node 902, is reserved in the VF 922 on the protect link to carry the protected traffic in the event of a failure in the flow of protected traffic. As in the case of the un-bridged embodiment illustrated in FIGS. 7A and 7B, the protect VF 922 can carry unprotected, low priority traffic in this reserved bandwidth that will be dropped in the event of a protection switching event.

Figure 9B:
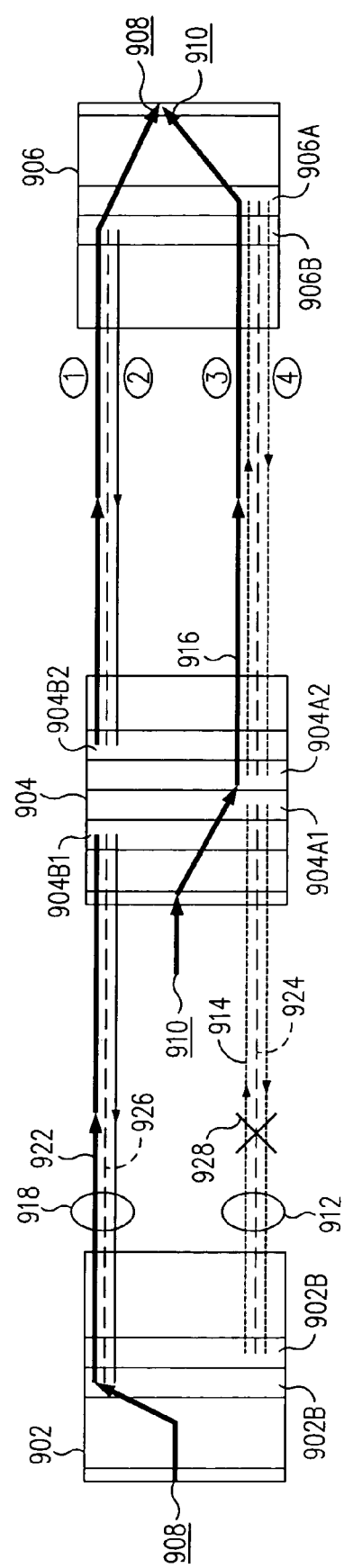
FIG. 9B is a schematic representation of the un-bridged, point-to-point hybrid system with intermediate node shown in FIG. 9A after a traffic flow failure and restoration thereof in accordance with the OMRP method.

As illustrated in FIG. 9B, in the event of a failure in the active link between the end node 902 and the intermediate node 904, such as the break 928 in the fiber illustrated therein, both the end node 902 and the intermediate node 904 detect the failure as a LOS, and in response thereto, each generates a PSS and transmits it over the MCF 924 of the only PPG passing through the interrupted fiber, viz., PPG 912, indicating the occurrence of the failure. The end node 902 sends the PSS "upstream" from the break 928, and the intermediate node 904 sends it "downstream" therefrom.

Since the system 900 is operating in the unabridged mode, in response to the PSS, the Ingress node 902 and the Egress node 906 exchange a PSS signal over the MCF 926 of the protect PPG 918, which results in the Ingress node 902 switching its transmission of the protected portion of the ingress traffic 908, viz., the protected traffic VF 914, into the bandwidth reserved for it in the protect VF 922 on the protect link ①, and the Egress end node 906 correspondingly switches to its protect RAP 906B to receive the VF 914 over that link. However, as above, the Egress node 906, which is not immediately aware of the fiber break 928 until notified thereof by the PSS from the intermediate node 904, switches reception of only the traffic that was affected by the break, viz., the protected VF 914 from the end node 902. As above, any unprotected traffic in the bandwidth reserved for the protected traffic VF 914 is dropped to make way for the protect traffic, and the traffic that was not on the failed link, viz., the ingress traffic 910 from the intermediate node 904 contained in the active VF 916, remains on the active link ③, and the Egress node 906 continues to receive that traffic on its active RAP 906A.

Figure 10A:
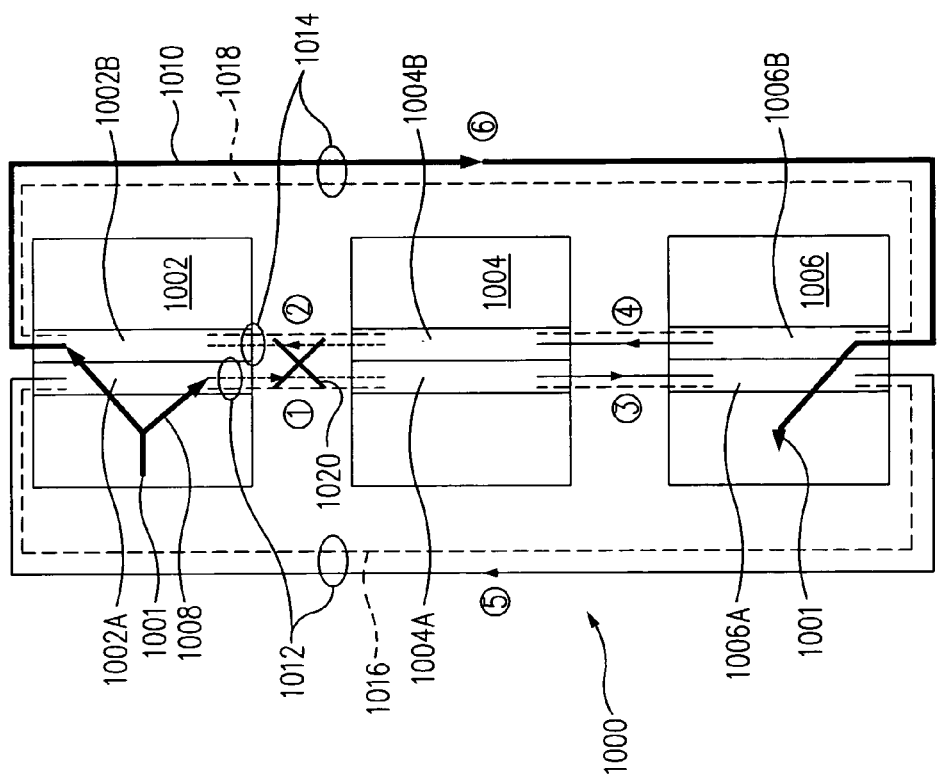
FIG. 10A is a schematic representation of a hybrid system deployed in a 2-fiber unidirectional ring configuration during normal operation.

FIG. 10A illustrates the implementation of the OMRP method in a hybrid network 1000 deployed in a "Two-fiber Unidirectional Ring" configuration and operating in a bridged mode. The network 1000 includes three nodes 1002, 1004, and 1006, each having a respective active RAP 1002A, 1004A, or 1006A, and a respective protect RAP 1002B, 1004B, or 1006B.

In normal, bridged operation, the Ingress node 1002 sends ingress traffic 1001 to the Egress node 1006 in an active virtual traffic flow VF 1008 via its active RAP 1002A, through the intermediate node 1004 and the active links ① and ③, and simultaneously, sends identical protect virtual traffic flow VF 1010 directly (i.e., without passing through the intermediate node 1004) to the Egress node 1006 over the protect link ⑥. The active RAP 1006A in the Egress node 1006 samples the traffic over both the active links ①–③ and the protect link ⑥, and selects the traffic from the active links.

As above, at least two PPGs, an "active," or "working," PPG 1012, comprising the active VF 1008, and at least one "protect" PPG 1014, comprising the protect VF 1010, are provisioned in the network 1000. Additionally, respective MCFs 1016 and 1018 are provisioned in each PPG, as above.

Figure 10B:
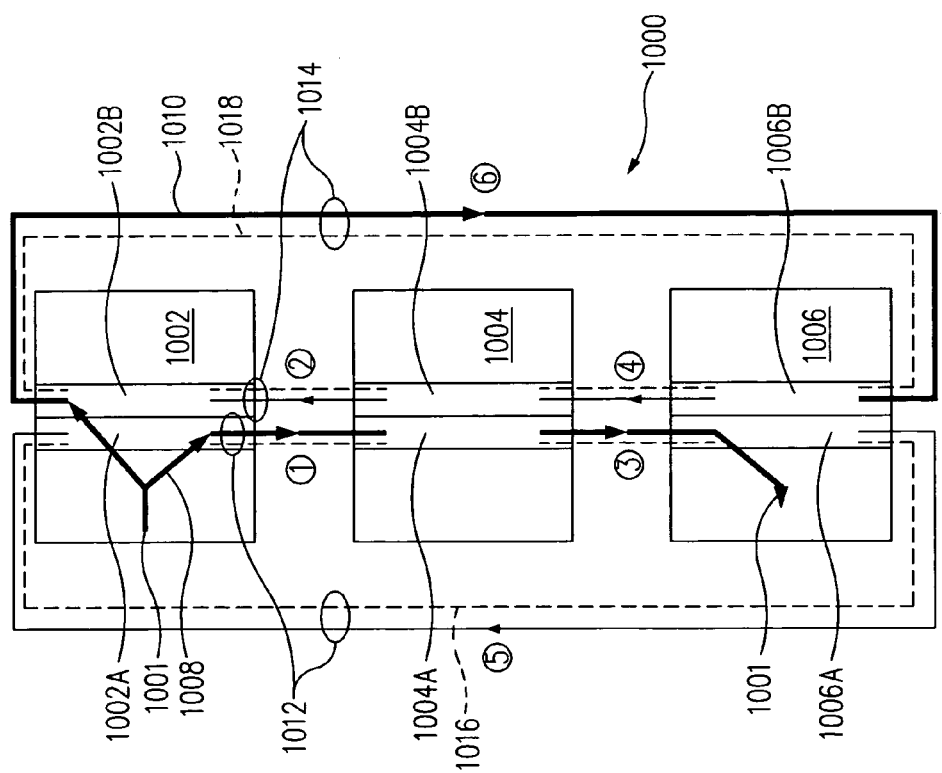
FIG. 10B is a schematic representation of the 2-fiber unidirectional ring hybrid system shown in FIG. 10A after a traffic flow failure and restoration thereof in accordance with the OMRP method.

The response of the network 1000 to a failure 1020 in the working PPG 1012 is illustrated in FIG. 10B, and is similar to that of the respective bridged, point-to-point networks 600 and 800 described above in connection with FIGS. 6A, 6B, and 8A, 8B, respectively. In particular, on the occurrence of the failure 1020 in the active VF 1008, both the Ingress node 1002 and the intermediate node 1004 detect the resulting loss or degradation in the active signal, whereas, the Egress node 1006 does not. Each of the former nodes generates a PSS and transmits it on the MCF 1016 of the working PPG 1012 in opposite directions from the break 1020. Upon its receipt of the PSS from the intermediate node 1004, the Egress node 1006, which is not immediately adjacent to the failure 1020, and hence, is not immediately "aware" of it, switches its reception from the interrupted active traffic to the protect traffic VF 1010, carried on the protect link ⑥, and received by its protect RAP 1006B, to restore the flow of traffic in the system.

As those of skill in the art will appreciate, it is possible to operate a two-fiber unidirectional ring network in an unbridged mode. However, it is believed that, in light of the foregoing teachings, and those described above in conjunction with the unabridged, point-to-point network 700 shown in FIGS. 7A and 7B, the implementation of the OMRP in such a configuration will be apparent to such persons without further explication.

Figure 11B:
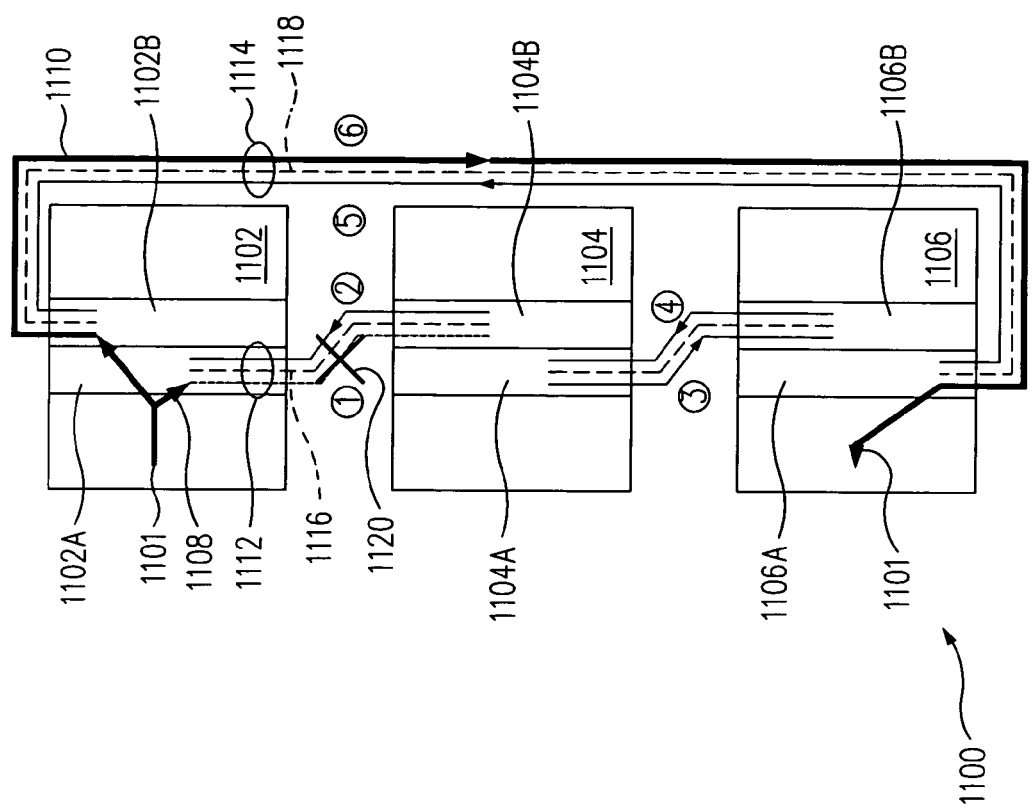
FIG. 11B is a schematic representation of the 2-fiber bi-directional ring hybrid system of FIG. 11A after a traffic flow failure and restoration thereof in accordance with the OMRP method.
Figure 11A:
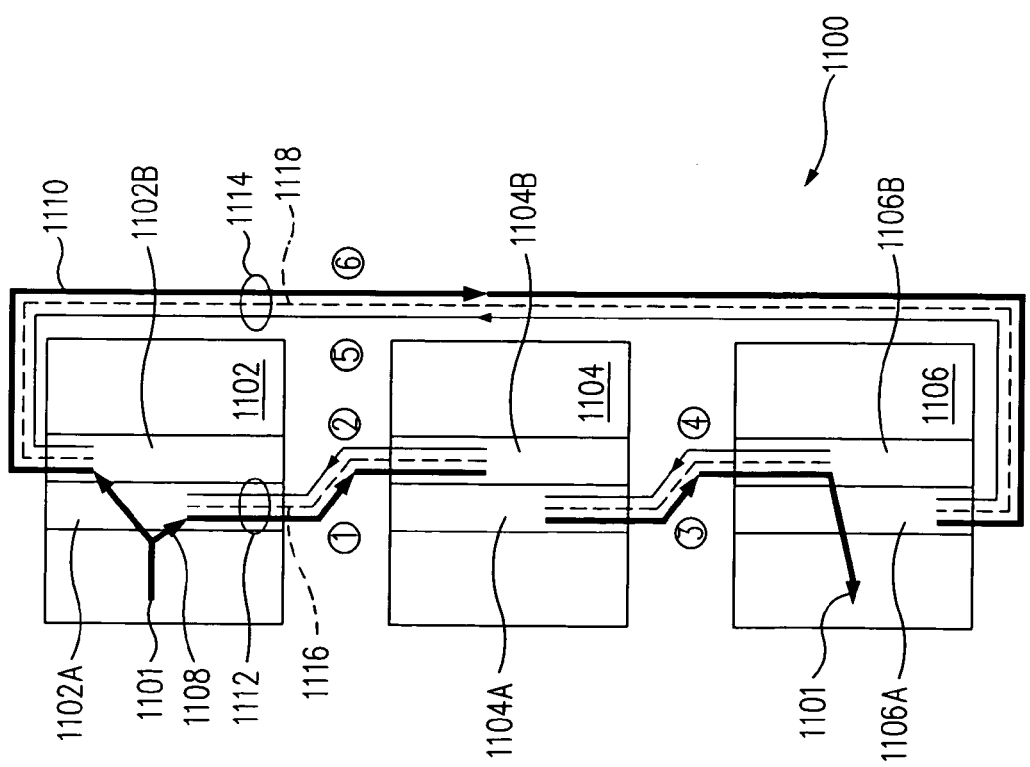
FIG. 11A is a schematic representation of a hybrid system deployed in a 2-fiber bi-directional ring configuration during normal operation.

FIG. 11A illustrates the implementation of the OMRP method in a hybrid network 1100 deployed in a "Two-fiber Bi-directional Ring" configuration and operating in a bridged mode. The network 1100 includes three nodes 1102, 1104, and 1106, each having a respective active RAP 1102A, 1104A, or 1106A, and a respective protect RAP 1102B, 1104B, or 1106B.

In normal bridged operation of the system 1100, the Ingress node 1102 sends ingress traffic 1101 to the Egress node 1106 in an active traffic flow VF 1108, sent through its active RAP 1102A and the intermediate node 1104 via the active links ① and ③, and simultaneously, sends an identical protect traffic flow VF 1110 directly (i.e., without passing through the intermediate node 1104) to the Egress node 1106 over the protect link ⑥. The active RAP 1106A in the Egress node 1106 samples the traffic over both the active links ①–③ and the protect link ⑥, and selects the traffic from the active links.

Protection provisioning and switching for the network 1100 are both substantially similar to those for the two-fiber Unidirectional Ring 1000 discussed above in connection with FIGS. 10A and 10B. Thus, two PPGs, an "active" PPG 1112, comprising the active VF 1108, and a "protect" PPG 1114, comprising the protect VF 1110, are provisioned in the network 1100. Additionally, respective MCFs 1116 and 1118 are provisioned in respective ones of the two PPGs, as above.

The response of the network 1100 to a failure 1120 in the active VF 1108 is illustrated in FIG. 11B. Upon the occurrence of the failure 1120 in the active VF 1108, both the Ingress node 1102 and the intermediate node 1104 detect the failure, and in response, generate and transmit a PSS in the MCF 1116 of the active PPG 1112, in opposite directions from the failure. Upon its receipt of the PSS from the intermediate node 1104, the egress node 1106, which is not immediately aware of the failure 1120, switches its reception from the interrupted active traffic flow VF 1108 to the protect traffic flow VF 1110 carried on the protect link ⑥ and received by the protect RAP 1106B therein, to restore the flow of protected traffic in the system 1100.

Figure 12A:
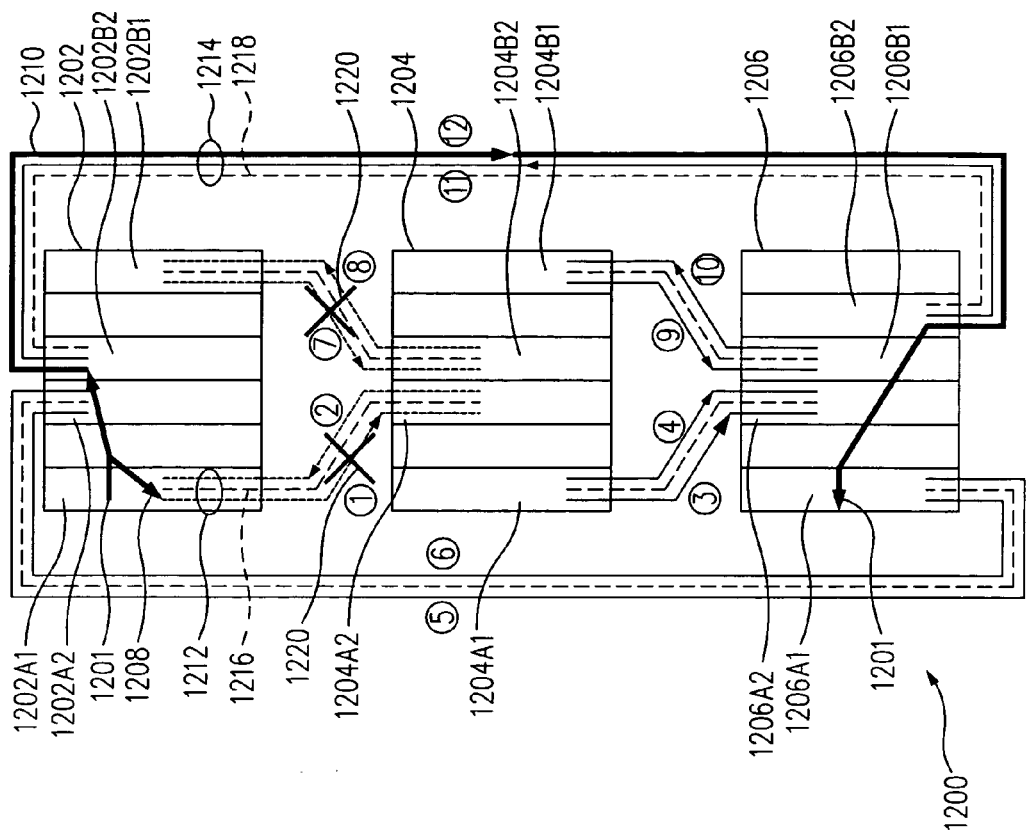
FIG. 12A is a schematic representation of a hybrid system deployed in a 4-fiber bi-directional ring configuration during normal operation.

FIG. 12A illustrates the implementation of the OMRP method in a hybrid network 1200 deployed in a "Four-fiber Bi-directional Ring" configuration and operating in a bridged mode. The network 1200 includes three nodes 1202, 1204, and 1206, each of which is equipped with two pairs of RAPs, viz., active RAPs 1202A1 and A2, 1204A1 and A2, and 1206A1 and A2, and protect RAPs 1202B1 and B2, 1204B1 and B2, and 1206B1 and 1206B2, respectively. No physical diversity is assumed to be present for any of the links between any two adjacent nodes.

In normal bridged operation of the system 1200, the Ingress node 1202 sends the ingress traffic 1201 to the Egress node 1206 in an active virtual traffic flow VF 1208 via the active RAP 1202A1, through the intermediate node 1204, and over the active links ① and ③, and simultaneously, sends an identical protect virtual flow of traffic VF 1210 via the protect RAP 1202B2 directly (i.e., without passing through the intermediate node 1204) to the Egress node 1206 over the protect link . The active RAP 1206A1 in the Egress node 1206 samples the traffic over the active links ①–③ and the protect link , and selects the traffic from the active links.

Protection provisioning and switching for the network 1200 are both substantially similar to those for the two-fiber unidirectional ring 1000 configuration discussed above in connection with FIGS. 10A–10B, and the two-fiber bi-directional ring configuration 1100 discussed above in connection with FIGS. 11A and 11B, respectively. Thus, at least two PPGs, an active PPG 1212, comprising the active VF 1208, and at least one protect PPG 1214, comprising the protect VF 1210, are provisioned in the network 1200. Additionally, respective MCFs 1216 and 1218 are provisioned in each PPG, as above.

Figure 12B:
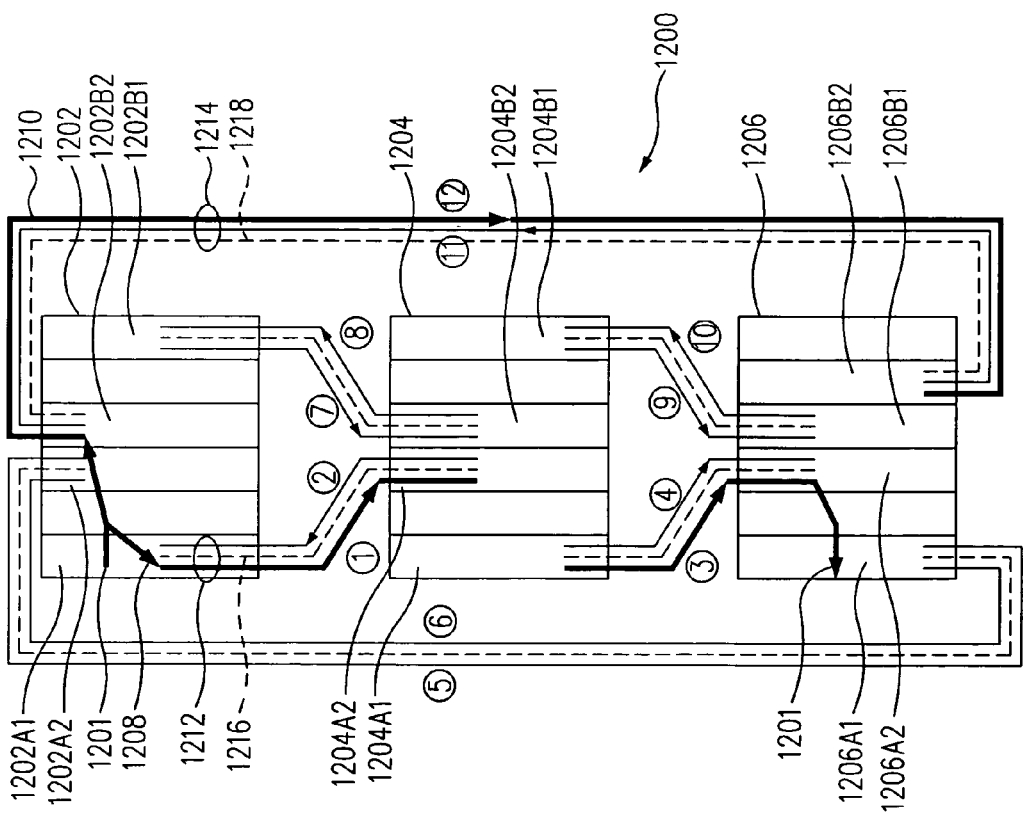
FIG. 12B is a schematic representation of the 4-fiber bi-directional ring hybrid system of FIG. 12A after a traffic flow failure and restoration thereof in accordance with the OMRP method.

The response of the network 1200 to a failure 1220 in the active VF is illustrated in FIG. 12B. Upon the occurrence of the failure 1220 in the active, protected VF 1208 between the Ingress node 1202 and the intermediate node 1204, each of the foregoing nodes detects the failure, generates a PSS, and transmits it on the MCF 1216 of the active PPG 1212 in the upstream and downstream directions, respectively. Upon its reception of the PSS from the intermediate node 1204, the Egress node 1206 switches its reception of the protected traffic from the active, or working, PPG 1212 to the protect traffic VF 1210 carried on the protect link ⑥, and received by the protect RAP 1206B1 therein, to embodiments above, the only PSE in this protection scenario is the Egress node 1206.

Figures 13A, 13B:
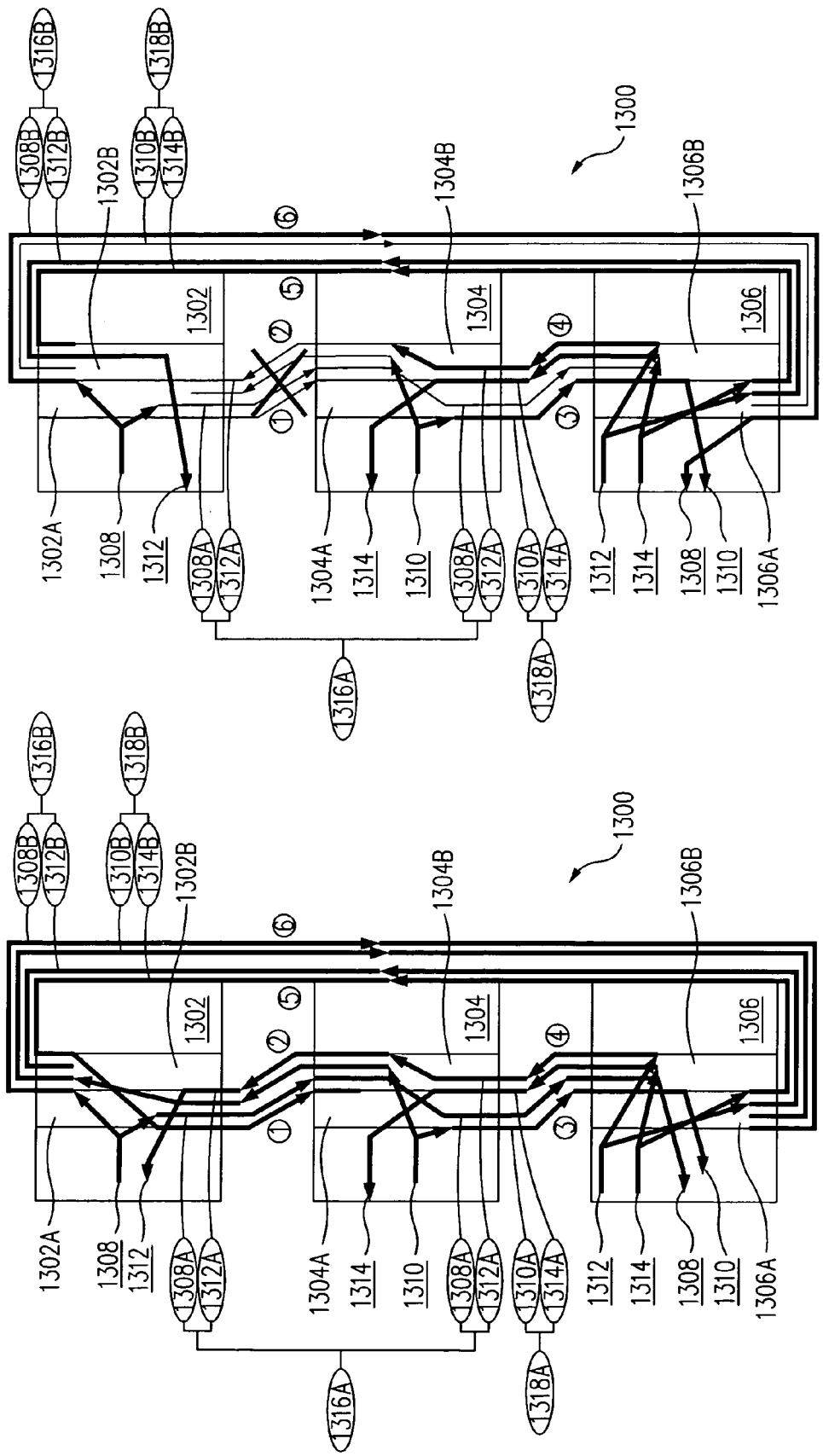
FIG. 13A is a schematic representation of a hybrid system deployed in a 2-fiber bi-directional ring configuration similar to that shown in FIG. 11A and having two separate Path Protection Groups ("PPGs") during normal operation; and, FIG. 13B is a schematic representation of the 2-fiber bi-directional ring system of FIG. 13A after a traffic flow failure and restoration thereof in accordance with the OMRP method of the present invention.

As a more generalized example of the failure communication framework of the OMRP method, a hybrid network 1300 deployed in a two-fiber bi-directional ring configuration and operating in a full-duplex, bridged mode, similar to that discussed above in connection with FIGS. 11A and 11B, is illustrated in FIG. 13A. The network 1300 includes three nodes 1302, 1304, and 1306, each equipped with a respective active RAP 1302A, 1304A, or 1306A, and a respective protect RAP 1302B, 1304B, or 1306B.

It should be understood that many VFs can exist simultaneously in any hybrid network, and that the OMRP method can protect all such VFs with equal facility, regardless of the configuration of the network. In the exemplary network 1300 illustrated in FIG. 13A, four virtual flows of traffic are assumed to exist. The first of these is traffic flow 1308, which enters the system at an "ingress" node 1302 and continues in two VFs: A) an active VF 1308A passing to and exiting at an "egress" node 1306 through an "intermediate" node 1304 via links ① and ③; and, B) a protect flow 1308B passing directly to the "egress" node 1306 via the link ⑥.

A second flow of traffic 1310 enters at an "ingress" node 1304 and continues in two VFs: A) an active VF 1310A passing directly to and exiting at an "egress" node 1306 via the link ③; and, B) a protect flow 1310B passing to the "egress" node 1306 through an "intermediate" node 1302 via the links ② and ⑥.

A third traffic flow 1312 enters at an "ingress" node 1306 and continues in two VFs: A) an active VF 1312A passing to and exiting at an "egress" node 1302 through an "intermediate" node 1304 via links ④ and ②; and, B) a protect flow 1302B passing directly to the "egress" node 1302 via the link ⑤.

A fourth traffic flow 1314 enters at an "ingress" node 1306 and continues in two VFs: A) an active VF 1314A passing directly to and exiting at an "egress" node 1304 via link ④; and, a protect VF 1314B passing to the "egress" node 1304 through an "intermediate" node 1302 via links ⑤ and ①.

Thus, in this example, all of the nodes 1302, 1304, and 1306 may be seen as capable of functioning simultaneously as an "ingress" node, an "intermediate" node, and/or an "egress" node with respect to the other nodes and the respective system traffic flows originating at or exiting from them. However, it may be further noted in this particular example that there is no traffic that originates in node 1302 and terminates in node 1304, or vice-versa. Additionally, it may be noted that only "active" traffic flows via links ③ and ④ only "protect" traffic flows via links ⑤ and ⑥, and that both "active" and "protect" traffic flows via links ① and ②. In light of this, the OMRP method protects all of the respective traffic flows between the nodes 1302 and 1306, and between the nodes 1304 and 1306, in the following manner.

Two pairs of PPGs are provisioned for the system. The first pair of PPGs protects the traffic between the I/E nodes 1302 and 1306, and comprises an "active" PPG 1316A that includes the "active" VFs between the nodes 1302 and 1306 that originate, i.e., enter, at one of the nodes and terminate, i.e., exit, at the other, viz., VFs 1308A and 1312A, and a "protect" PPG 1316B that includes the "protect" VFs between the nodes 1302 and 1306 that originate in one of the nodes and terminate in the other, viz., VFs 1308B and 1312B.

The second pair of PPGs protects the traffic between the I/E nodes 1304 and 1306, and comprises an "active" PPG 1318A that includes the "active" VFs between nodes 1304 and 1306 that originate in one of the nodes and terminate in the other, viz., VFs 1310A and 1314A, and a "protect" PPG that includes the "protect" VFs between nodes 1304 and 1306 that originate in one of the nodes and terminate in the other, viz., VFs 1310B and 1314B. As before, each PPG has a dedicated MCF (omitted for clarity) provisioned in it for communication of failure information, as described below.

In normal, bridged operation, each of the nodes receives its respective incoming traffic over the active PPGs 1316A and 1318A. When a failure occurs, e.g., a fiber cut 1320 occurring in on the links ① and ② between the nodes 1302 and 1304, such as that illustrated in FIG. 13B, the node 1304 then detects a LOS on link ①, and the node 1302 detects a LOS on link ②.

When the node 1304 detects the failure in link ①, it sends a PSS on the MCF associated with each and every PPG, active and protect, passing through it on the failed link, viz., the MCFs associated with the active PPG 1316A and the protect PPG 1316B, each of which passes through the node 1304 on links ① and ③, respectively. However, the node 1304 does not immediately detect the LOS on link ② because it is "upstream" relative to the two VFs thereon, viz., 1314B and 1312A.

Furthermore, since the second pair of PPGs 1318A and 1318B originates in the node 1304 and does not pass through link ①, and because the node 1304 is upstream of the flow on link ②, the node 1304 does not send any messages on the MCFs associated with the second pair of PPGs. However, if an active PPG that terminated in node 1304 had passed through either of the failed links ① and ②, then node 1304 would have immediately detected the failure, would have sent such a PSS on the MCF of the affected PPG, and would have initiated a "local receiver link switch," i.e., would have switched itself to receive the protect VF on its protect RAP 1304B.

When the node 1302 detects the failure 1320 in the link ②, it sends a PSS on the MCF of the protect PPG of the second pair of PPGs, viz., PPG 1318B. As above, node 1302 also effects a "local receiver link switch" for all active PPGs that terminate in it and that pass through the link ②, viz., PPG 1316A, such that the node 1302 now receives the protect VF 1312B in the protect PPG 1316B on its protect RAP 1302B via link ⑤.

Upon its receipt of a PSS over an affected MCF, each node, acting as a PSE, makes a determination of whether to switch between an active and a protect PPG. In the particular example of FIG. 13B, the node 1306 is one of the relevant PSEs for the first PPG pair, i.e., PPGs 1316A and 1316B, with the other PSE being the node 1302. As above, although the node 1306 received a PSS over the MCF of the active PPG 1316A from the node 1304, it did not receive a PSS over the MCF of the protect PPG 1316B. Responsively, the node 1306 then switches to receive the protect PPG 1316B on its active RAP 1306B, thereby restoring interrupted active VF 1308A by replacing it with the protect VF 1308B.

Since the second pair of PPGs 1318A and 1318B are not affected by the fiber cut 1320, the nodes 1304 and 1306, which are the relevant PSEs for the second pair of PPGs, continue to receive their respective active VFs 1310A and 1312A normally, i.e., through the active PPG 1318A. Therefore, the PSS sent out over the MCF of the protect PPG 1318B by the node 1302 is simply "ignored" by the node 1306.

As discussed above, since the active PPG 1316A of the first PPG pair passes through the link ①, and since the node 1302, which is one of the PSEs for the first pair of PPGs 1316A and 1316B, immediately detects the LOS on the link ②, the "local link switch" executed by the node 1302 in response thereto forces the node 1302 to receive traffic from PPG 1316B via the link ⑤, instead of on the active PPG 1316A via link ②.

Thus, the OMRP method fully recovers the protected traffic flows in the bridged system 1300 from the failure 1320. From the above, it may be seen that, in the OMRP method, only the PSEs and the nodes that detect a failure on an active PPG are involved in the protection switching activity. All other nodes are unaffected by the failure, and continue to function as before the occurrence thereof.

While the foregoing description of the OMRP method is with respect to a bridged system 1300, it is believed that, in light of the above disclosures, particularly those found above in conjunction with the un-bridged point-to-point networks 700 and 900 shown in FIGS. 7A–7B and 9A–9B, respectively, the implementation of the OMRP in an un-bridged configuration will by now be apparent to such persons. Indeed, the only substantial difference in the OMRP method with regard to the two modes of operation is that, in an un-bridged system implementing the OMRP method, the affected, relevant PSEs exchange a PSS communication between themselves before effecting protection switching, as discussed above. In all other respects, the method remains the same.

Indeed, by now, those of skill in the art will recognize that many other variations and modifications can be made in the OMRP method of the present invention without departing from its true scope and spirit. In light of this, the scope of the present invention should not be limited to that of the particular embodiments illustrated and described herein, as they are merely exemplary in nature, but should instead conform to that of the several claims appended hereafter and their functional equivalents.

What is claimed is:

1. A method for protecting traffic in a network against a failure, the method comprising:
   provisioning a dedicated Management Control Flow ("MCF") in each of an active Path Protection Group ("PPG") and a corresponding protect PPG;
   wherein the active PPG comprises only active Virtual Flows (VFs) along a first physical path and the corresponding protect PPG comprises a plurality of protect VFs that correspond to the active VFs in the active PPG, the protect PPG and the protect VFs contained therein taking a second physical path different from the first physical path taken by the active PPG;
   wherein at least each active VF carries traffic between an ingress node and an egress node of the network;
   sending protected traffic between the ingress node and the egress node via at least the active PPG;
   receiving the protected traffic at the egress node via at least the active PPG;
   generating a protection switching signal ("PSS") in response to detection of a failure in a path of an active VF;
   transmitting the PSS in the dedicated MCF of the active PPG containing the active VF to at least one of the ingress node and the egress node; and
   at least one of the ingress node and the egress node receiving the PSS and respectively switching at least one of the sending and the receiving of the protected traffic, from via the active PPG to via the protect PPG, in response to the PSS.

2. The method of claim 1 wherein:
protected traffic is sent in parallel via both the active PPG and the protect PPG.

3. The method of claim 2 wherein:
receiving of the protected traffic from via the active PPG is switched to via the protect PPG in response to receipt of the PSS in the dedicated MCF.

4. The method of claim 1 wherein:
protected traffic is initially sent and received only via the active PPG; and
bandwidth is reserved in the protect PPG in an amount equal to that occupied by the protected traffic in the active PPG.

5. The method of claim 1 wherein:
the network further comprises an intermediate node between the ingress node and the egress node;
at least one of the active PPG and the protect PPG pass through the intermediate node; and,
the detection of failure comprises at least one of the ingress, the intermediate, and the egress nodes detecting failure; and
the PSS is transmitted in the dedicated MCF of each of the active PPG and the protect PPG to at least one of the ingress node and the egress node.

6. The method of claim 5 wherein:
only one of the the active PPG and the protect PPG pass through the intermediate node.

7. The method of claim 5 wherein:
each of the the active PPG and the protect PPG pass through the intermediate node.

8. The method of claim 1 wherein:
the traffic comprises at least one of Time-Division-Multiplexed ("TDM") traffic, Asynchronous Transport Mode ("ATM") traffic, and Multi-Protocol Label Switched ("MPLS") packet traffic.

9. The method of claim 1 wherein:
the MPLS traffic comprises Internet Protocol traffic or Packet Over SONET traffic.

10. The method of claim 1 wherein:
each of the nodes comprises one of an Add-Drop Multiplexer ("ADM"), an ATM switch, and a Label Switching Router ("LSR").

11. The method of claim 1 wherein:
the detection of failure is performed by detecting one of a loss of signal ("LOS"), a loss of framing ("LOF"), and a bit error rate ("BER") in excess of a given threshold value.

12. The method of claim 1 wherein:
the network includes a transport layer comprising at least one of a synchronous digital hierarchy ("SDH") layer, a synchronous optical network ("SONET") layer, a direct wavelength division multiplexing ("WDM") layer, and a Gigabit Ethernet layer.

13. The method of claim 1 wherein:
the PSS is transmitted on at least one of the active PPG and the protect PPG.

* * * * *